(12) United States Patent
Xu et al.

(10) Patent No.: US 11,096,177 B2
(45) Date of Patent: Aug. 17, 2021

(54) OPERATION MODE SWITCHING METHOD AND USER EQUIPMENT

(71) Applicant: HUAWEI TECHNOLOGIES CO., LTD., Guangdong (CN)

(72) Inventors: Liangguang Xu, Xi'an (CN); Xin Lv, Xi'an (CN); Fan Yang, Shenzhen (CN); Bo Meng, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/465,725

(22) PCT Filed: Dec. 2, 2016

(86) PCT No.: PCT/CN2016/108447
§ 371 (c)(1),
(2) Date: May 31, 2019

(87) PCT Pub. No.: WO2018/098825
PCT Pub. Date: Jun. 7, 2018

(65) Prior Publication Data
US 2019/0306851 A1 Oct. 3, 2019

(51) Int. Cl.
*H04W 72/04* (2009.01)

(52) U.S. Cl.
CPC ......... *H04W 72/048* (2013.01); *H04W 72/04* (2013.01); *Y02D 30/70* (2020.08)

(58) Field of Classification Search
CPC ............... H04W 72/048; H04W 72/04; H04W 52/0251; H04W 52/02; H04W 76/30;
(Continued)

(56) References Cited

U.S. PATENT DOCUMENTS 9,019,836 B2 *  4/2015  Klingenbrunn ....... H04W 28/12
                                                                   370/236
9,344,318 B2 *  5/2016  Nilsson ............... H04L 27/2647
(Continued)

FOREIGN PATENT DOCUMENTS

CN        105072652 A      11/2015
CN        105391468 A       3/2016
(Continued)

OTHER PUBLICATIONS

Office Action issued in Chinese Application No. 201680065252.X dated Mar. 2, 2020, 7 pages.
(Continued)

*Primary Examiner* — Frank Duong
(74) *Attorney, Agent, or Firm* — Fish & Richardson P.C.

(57) ABSTRACT

An operation mode switching method and user equipment are disclosed, so that an operation mode of the user equipment can be automatically switched. A specific solution is: determining, by user equipment, that a current data transmission rate of the user equipment is less than a first rate threshold, and/or a battery temperature of the user equipment is greater than a first temperature threshold; determining, by the user equipment, that the user equipment is in a CA operation mode; changing, by the user equipment, a transmission mode parameter of the user equipment to a transmission mode parameter corresponding to a non-CA operation mode; and restarting, by the user equipment, a communications module of the user equipment, and sending a first access request to a base station, where the first access request carries the transmission mode parameter corresponding to the non-CA operation mode.

11 Claims, 12 Drawing Sheets

(58) Field of Classification Search
CPC ..... H04W 24/10; H04W 76/38; H04W 72/00; H04W 76/27; H04W 72/02; H04W 76/20; Y02D 70/00; H04L 5/001; H04L 5/0098
See application file for complete search history.

(56) References Cited

U.S. PATENT DOCUMENTS

| | | | | |
|---|---|---|---|---|
| 10,141,958 | B2* | 11/2018 | Ranta | H04B 1/0458 |
| 2013/0201834 | A1 | 8/2013 | Klingenbrunn et al. | |
| 2013/0322371 | A1 | 12/2013 | Prakash et al. | |
| 2015/0110229 | A1* | 4/2015 | Kim | H04B 7/082 375/347 |
| 2016/0241193 | A1* | 8/2016 | Nilsson | H04B 1/0067 |
| 2016/0242191 | A1 | 8/2016 | Liao et al. | |
| 2016/0262177 | A1 | 9/2016 | Chuttani et al. | |
| 2017/0063404 | A1* | 3/2017 | Langer | H04B 1/0057 |

FOREIGN PATENT DOCUMENTS

| | | |
|---|---|---|
| CN | 105391469 A | 3/2016 |
| CN | 105898895 A | 8/2016 |
| JP | 2007312066 A | 11/2007 |
| JP | 2014003440 A | 1/2014 |
| JP | 2014216909 A | 11/2014 |
| JP | 2016517213 A | 6/2016 |
| JP | 2019529944 A | 10/2019 |
| WO | 2015147720 A1 | 10/2015 |

OTHER PUBLICATIONS

PCT International Search Report and Written Opinion in International Application No. PCT/CN2016/108447, dated Aug. 25, 2018, 17 pages (With English translation).

Extended European Search Report issued in European Application No. 16922965.5 dated Nov. 29, 2019, 14 pages.

Office Action issued in Japanese Application No. 2019-529944 dated Sep. 14, 2020, 9 pages (with English translation).

Office Action issued in Japanese Application No. 2019-529944 dated Jun. 7, 2021, 5 pages (with English translation).

* cited by examiner

OPERATION MODE SWITCHING METHOD AND USER EQUIPMENT

CROSS-REFERENCE TO RELATED APPLICATIONS

This application is a national stage of International Application No. PCT/CN2016/108447, filed on Dec. 2, 2016, which is hereby incorporated by reference in its entirety.

TECHNICAL FIELD

The present invention relates to the field of communications technologies, and in particular, to an operation mode switching method and user equipment.

BACKGROUND

A carrier aggregation (English: Carrier Aggregation, CA for short) technology can aggregate at least two contiguous or non-contiguous component carriers (English: Component Carrier, CC for short) into larger bandwidth (for example, 2CC and 3CC) to satisfy a service requirement. Specifically, the 2CC means that carrier aggregation is performed on two contiguous or non-contiguous component carriers, and the 3CC means that carrier aggregation is performed on three contiguous or non-contiguous component carriers. Using the CA technology increases a wireless communication rate, but substantially increases power consumption of user equipment (English: User Equipment, UE for short). UE supporting a CA function is briefly referred to as CA-UE.

The CA-UE does not need to continuously perform high-speed data service transmission, in other words, the CA-UE does not need to continuously work in a CA operation mode. Therefore, to reduce power consumption of the CA-UE, a base station (English: Base Station, BS for short) may switch an operation mode of the CA-UE based on information such as a data service performed by the CA-UE and a network status. For example, the BS may switch the operation mode of the CA-UE from the CA operation mode to a non-CA operation mode when the CA-UE does not need to perform high-speed data service transmission.

However, an existing problem is that: in the prior art, the BS decides the operation mode of the CA-UE, and instructs the CA-UE to switch the operation mode, and the CA-UE cannot automatically switch the operation mode of the CA-UE.

SUMMARY

An operation mode switching method and user equipment are provided, so that the user equipment can automatically switch an operation mode of the user equipment.

According to a first aspect, an operation mode switching method is provided, including: determining, by user equipment, that the user equipment satisfies a first preset condition, where the first preset condition includes: a current data transmission rate of the user equipment is less than a first rate threshold, and/or a battery temperature of the user equipment is greater than a first temperature threshold; determining, by the user equipment, that the user equipment is in a CA operation mode; changing, by the user equipment, a transmission mode parameter of the user equipment to a transmission mode parameter corresponding to a non-CA operation mode, where the transmission mode parameter of the user equipment is used for representing a data transmission rate of the user equipment, the CA operation mode and the non-CA operation mode are corresponding to different transmission mode parameters, a data transmission rate represented by a transmission mode parameter corresponding to the CA operation mode is greater than a data transmission rate represented by the transmission mode parameter corresponding to the non-CA operation mode; and restarting, by the user equipment, a communications module of the user equipment, and sending a first access request to a base station, where the first access request carries the transmission mode parameter corresponding to the non-CA operation mode.

If the current data transmission rate of the user equipment is less than the first rate threshold, and the user equipment determines that the user equipment is in the CA operation mode, it indicates that a current service performed by the user equipment has a relatively low requirement on a data transmission rate, and does not require high-speed data transmission to be performed. In other words, it indicates that normal execution of the current service can be ensured when the user equipment currently works in the non-CA operation mode that may provide a relatively low data transmission rate; and to ensure the normal execution of the current service, it is not necessary for the user equipment to work in the CA operation mode that may provide a relatively high data transmission rate. In this solution, to reduce power consumption of the user equipment, when the current data transmission rate of the user equipment is less than the first rate threshold, the user equipment may change the transmission mode parameter of the user equipment to the transmission mode parameter corresponding to the non-CA operation mode, then restart the communications module of the user equipment, and send the first access request to the base station, where the first access request carries the transmission mode parameter corresponding to the non-CA operation mode, to request the base station to change the transmission mode parameter of the user equipment to the transmission mode parameter corresponding to the non-CA operation mode, so that the user equipment works in the non-CA operation mode.

When the user equipment performs high-speed data transmission, the power consumption of the user equipment is relatively large, and this may cause the battery temperature of the user equipment to be relatively high. When the battery temperature of the user equipment is greater than a value, power-off is triggered, and even there may be a security threat. When the user equipment works in the CA operation mode that may provide the relatively high data transmission rate, the power consumption of the user equipment is relatively high, and when the user equipment works in the non-CA operation mode that may provide the relatively low data transmission rate, the power consumption of the user equipment is relatively low. Therefore, to reduce the power consumption of the user equipment, so as to reduce the battery temperature of the user equipment, when the battery temperature of the user equipment is greater than the first temperature threshold and the user equipment determines that the user equipment is in the CA operation mode, the user equipment may change the transmission mode parameter of the user equipment to the transmission mode parameter corresponding to the non-CA operation mode, then restart the communications module of the user equipment, and send the first access request to the base station, where the access request carries the transmission mode parameter corresponding to the non-CA operation mode, to request the base station to change the transmission mode parameter of the user equipment to the transmission mode parameter corresponding to the non-CA operation mode, so that the user equipment works in the non-CA operation mode.

According to this solution, the user equipment may automatically detect the current data transmission rate and/or the battery temperature of the user equipment, and when the current data transmission rate of the user equipment is less than the first rate threshold and/or the battery temperature is greater than the first temperature threshold, change, on the user equipment, the transmission mode parameter of the user equipment if the user equipment is in the CA operation mode. The user equipment restarts the communications module of the user equipment, and sends the first access request to the base station, to request the base station to change the transmission mode parameter of the user equipment to the transmission mode parameter corresponding to the non-CA operation mode, so that the base station switches the operation mode of the user equipment from the CA operation mode to the non-CA operation mode, that is, the user equipment may automatically switch the operation mode of the user equipment.

In a possible implementation, the communications module of the user equipment is a modulator-demodulator (English: Modulator-DEModulator, MODEM for short) of the user equipment. That the user equipment restarts the MODEM of the user equipment may be specifically that the user equipment restarts a protocol stack of the user equipment.

In a possible implementation, the transmission mode parameter may be a protocol stack version of the user equipment. The user equipment may implement, on the user equipment, operation mode switching for the user equipment by changing the protocol stack of the user equipment. Specifically, the changing, by the user equipment, a transmission mode parameter of the user equipment to a transmission mode parameter corresponding to a non-CA operation mode may include: changing, by the user equipment, the protocol stack version of the user equipment from a first version to a second version. The protocol stack of the first version is corresponding to the CA operation mode, and the protocol stack of the second version is corresponding to the non-CA operation mode.

The user equipment may work in different protocol stacks, and transmission mode parameters corresponding to operation modes corresponding to the protocol stacks are different. For example, a protocol stack of the first version is corresponding to the CA operation mode, and a protocol stack of the second version is corresponding to the non-CA operation mode. The transmission mode parameter corresponding to the CA operation mode is different from the transmission mode parameter corresponding to the non-CA operation mode. For example, when the protocol stack of the first version is a release 10, the release 10 supports a 2CC operation mode (that is a CA operation mode), a data capability category of the release 10 is a category (English: Category, CAT for short) 6, and a data transmission rate represented by a transmission mode parameter of the CAT 6 is 300 million bits per second (English: Million bits per second, Mbps for short). When the protocol stack of the second version is a release 9, the release 9 supports the non-CA operation mode, a data capability category of the release 9 is a CAT 4, and a data transmission rate represented by a transmission mode parameter of the CAT 4 is 150 Mbps. For example, that the user equipment changes the protocol stack of the user equipment from the protocol stack of the first version to the protocol stack of the second version may include changing the protocol stack of the user equipment from the release 10 to the release 9.

In a possible implementation, the user equipment stores a configuration file, the configuration file includes an identifier of a CA combination supported by the user equipment, and the configuration file may be used for indicating to the user equipment: an operation mode of the user equipment, so that the user equipment works in the operation mode indicated by the configuration file; and the transmission mode parameter may be the identifier that is of the CA combination supported by the user equipment and that is included in the configuration file of the user equipment. Therefore, by changing the identifier that is of the CA combination supported by the user equipment and that is included in the configuration file, the user equipment may change the transmission mode parameter corresponding to the operation mode of the user equipment, to implement, on the user equipment, the operation mode switching for the user equipment. Specifically, the changing, by the user equipment, a transmission mode parameter of the user equipment to a transmission mode parameter corresponding to a non-CA operation mode may include: deleting, by the user equipment, the identifier that is of the CA combination supported by the user equipment and that is included in the configuration file of the user equipment. After the user equipment deletes the identifier that is of the CA combination supported by the user equipment and that is included in the configuration file of the user equipment, the configuration file does not include the identifier indicating the CA combination supported by the user equipment, and it indicates that currently the user equipment cannot support the CA operation mode. In this way, the user equipment may implement, on the user equipment, the operation mode switching for the user equipment, so that the user equipment works in the non-CA operation mode, and changes the transmission mode parameter of the user equipment to the transmission mode parameter corresponding to the non-CA operation mode.

In a possible implementation, after the user equipment restarts the communications module of the user equipment, and sends the first access request to the base station, the operation mode switching method provided in the first aspect may further include: receiving, by the user equipment, a first access response sent by the base station. The first access response is used for indicating that the base station has switched the operation mode of the user equipment from the CA operation mode to the non-CA operation mode. When the user equipment receives the first access response sent by the base station, the user equipment may determine that the operation mode of the user equipment has been successfully switched from the CA operation mode to the non-CA operation mode, and may begin to work in the non-CA operation mode.

In a possible implementation, after the operation mode of the user equipment is switched from the CA operation mode to the non-CA operation mode, the power consumption of the user equipment may be reduced. If the power consumption of the user equipment is relatively low after the user equipment works in the non-CA operation mode for a period of time, the base station may switch the operation mode of the user equipment from the non-CA operation mode to the CA operation mode. To avoid frequent operation mode switching for the user equipment, the base station may receive a second access request, and when the current data transmission rate of the user equipment is less than a second rate threshold and/or the battery temperature of the user equipment is less than a second temperature threshold (in other words, the battery temperature of the user equipment is relatively low, and does not cause the user equipment to be powered off, and there is no security threat), change the transmission mode parameter of the user equipment to the transmission mode parameter corresponding to the CA operation mode, to switch the operation mode of the user equipment from the non-CA operation mode to the CA operation mode. Specifically, after the user equipment sends the first access request to the base station, the operation mode switching method may further include: determining, by the user equipment, that the user equipment satisfies a second preset condition, where that the user equipment satisfies a second preset condition includes: the current data transmission rate of the user equipment is less than a second rate threshold, and/or the battery temperature of the user equipment is less than a second temperature threshold, where the first rate threshold is greater than the second rate threshold, and the first temperature threshold is greater than the second temperature threshold; determining, by the user equipment, that the user equipment is in the non-CA operation mode; changing, by the user equipment, the transmission mode parameter of the user equipment to the transmission mode parameter corresponding to the CA operation mode; and restarting, by the user equipment, the communications module of the user equipment, and sending a second access request to the base station, where the second access request carries the transmission mode parameter corresponding to the CA operation mode. In this solution, the "switching the operation mode of the user equipment from the non-CA operation mode to the CA operation mode" is performed only when the user equipment may satisfy the following two conditions: "the current data transmission rate of the user equipment is less than the second rate threshold" and "the battery temperature of the user equipment is less than the second temperature threshold". The current data transmission rate of the user equipment is not used as a sole determining condition to perform the operation mode switching for the user equipment. Frequent operation mode switching for the user equipment due to a change of the current data transmission rate can be avoided.

In a possible implementation, the transmission mode parameter is the protocol stack version of the user equipment. The user equipment may implement, on the user equipment, operation mode switching for the user equipment by changing the protocol stack of the user equipment. Specifically, the changing, by the user equipment, the transmission mode parameter of the user equipment to the transmission mode parameter corresponding to the CA operation mode may include: changing, by the user equipment, the protocol stack version of the user equipment from the second version to the first version, where the protocol stack of the first version is corresponding to the CA operation mode, and the protocol stack of the second version is corresponding to the non-CA operation mode. For example, when the protocol stack of the first version is a release 10, the release 10 supports a 2CC operation mode (that is a CA operation mode), a data capability category of the release 10 is a CAT 6, and a data transmission rate represented by a transmission mode parameter of the CAT 6 is 300 Mbps. When the protocol stack of the second version is a release 9, the release 9 supports the non-CA operation mode, a data capability category of the release 9 is a CAT 4, and a data transmission rate represented by a transmission mode parameter of the CAT 4 is 150 Mbps. For example, that the user equipment changes the protocol stack version of the user equipment from the second version to the first version may include changing the protocol stack of the user equipment from the release 9 to the release 10.

In a possible implementation, the user equipment stores a configuration file, the configuration file may include an identifier of a CA combination supported by the user equipment, and the configuration file may be used for indicating to the user equipment: an operation mode of the user equipment, so that the user equipment works in the operation mode indicated by the configuration file; and the transmission mode parameter is the identifier that is of the CA combination supported by the user equipment and that is included in the configuration file of the user equipment. Therefore, by changing the identifier that is of the CA combination supported by the user equipment and that is included in the configuration file, the user equipment may implement, on the user equipment, the operation mode switching for the user equipment. Specifically, the changing, by the user equipment, the transmission mode parameter of the user equipment to the transmission mode parameter corresponding to the CA operation mode may include: adding, by the user equipment, the identifier of the CA combination supported by the user equipment into the configuration file of the user equipment. After the user equipment adds the identifier of the CA combination supported by the user equipment into the configuration file of the user equipment, the configuration file may indicate the identifier of the CA combination supported by the user equipment, and it indicates that the user equipment currently can support the CA operation mode. In this way, the user equipment may implement, on the user equipment, the operation mode switching for the user equipment, so that the user equipment works in the CA operation mode, and changes the transmission mode parameter of the user equipment to the transmission mode parameter corresponding to the CA operation mode. For example, the identifier of the CA combination may include a specific CA combination or a quantity of CA combinations. For example, an identifier of a CA combination corresponding to the CA operation mode may be two non-contiguous component carriers "B1+B3", two contiguous component carriers "B1+B 1", or the like; or the identifier of the CA combination may be "2", indicating that the user equipment may support two CA combinations, and in this case, the user equipment may alternatively support two CA combinations: "B1+B3" and "B1+B1". The adding, by the user equipment, the identifier of the CA combination supported by the user equipment into the configuration file of the user equipment may include that the user equipment adds two CA combinations, namely, "B1+B3" and "B1+B1", into the configuration file of the user equipment.

In a possible implementation, after the user equipment restarts the communications module of the user equipment, and sends the second access request to the base station, the method further includes: receiving, by the user equipment, a second access response sent by the base station. The second access response is used for indicating that the base station has switched the operation mode of the user equipment from the non-CA operation mode to the CA operation mode. When the user equipment receives the second access response sent by the base station, the user equipment may determine that the operation mode of the user equipment has been successfully switched from the non-CA operation mode to the CA operation mode, and may begin to work in the CA operation mode.

In a possible implementation, the CA operation mode may include a 3CC operation mode and a 2CC operation mode. Compared with the 3CC operation mode, the 2CC operation mode may provide a lower data transmission rate, and power consumption of the user equipment working in the 2CC operation mode is less than power consumption of the user equipment working in the 3CC operation mode. Therefore, to reduce power consumption of the user equipment, the user equipment may further switch the user equipment from the 3CC operation mode to the 2CC operation mode when the user equipment currently works in the 3CC operation mode. Specifically, the operation mode switching method may further include: determining, by the user equipment, that the user equipment satisfies a third preset condition, where the third preset condition includes: the current data transmission rate of the user equipment is less than a third rate threshold, and/or the battery temperature of the user equipment is greater than a third temperature threshold; determining, by the user equipment, that the user equipment is in the 3CC operation mode; changing, by the user equipment, the transmission mode parameter of the user equipment from a transmission mode parameter corresponding to the current 3CC operation mode to a transmission mode parameter corresponding to the 2CC operation mode; and restarting, by the user equipment, the communications module of the user equipment, and sending a third access request to the base station, where the third access request carries the transmission mode parameter corresponding to the 2CC operation mode.

In a possible implementation, the third rate threshold is greater than the first rate threshold, and the third temperature threshold is less than the first temperature threshold.

In a possible implementation, the transmission mode parameter may be a protocol stack version of the user equipment. A method of changing, by the user equipment, the transmission mode parameter of the user equipment from the transmission mode parameter corresponding to the 3CC operation mode to the transmission mode parameter corresponding to the 2CC operation mode may include: changing, by the user equipment, the protocol stack version of the user equipment from a protocol stack version corresponding to the 3CC operation mode to a protocol stack version corresponding to the 2CC operation mode. The transmission mode parameter corresponding to the 2CC operation mode is different from the transmission mode parameter corresponding to the 3CC operation mode.

In a possible implementation, the transmission mode parameter may be the identifier that is of the CA combination supported by the user equipment and that is included in the configuration file of the user equipment. By changing the identifier that is of the CA combination supported by the user equipment and that is included in the configuration file, the user equipment may implement, on the user equipment, the operation mode switching for the user equipment. Specifically, the method of changing, by the user equipment, the transmission mode parameter of the user equipment from the transmission mode parameter corresponding to the 3CC operation mode to the transmission mode parameter corresponding to the 2CC operation mode may include: changing, by the user equipment, the identifier that is of the CA combination supported by the user equipment and that is included in the configuration file of the user equipment from a 3CC combination identifier to a 2CC combination identifier.

In a possible implementation, after the user equipment restarts the communications module of the user equipment, and sends the third access request to the base station, the operation mode switching method provided in the first aspect may further include: receiving, by the user equipment, a third access response sent by the base station. The third access response is used for indicating that the base station has switched the operation mode of the user equipment from the 3CC operation mode to the 2CC operation mode. When receiving the third access response sent by the base station, the user equipment may determine that the operation mode of the user equipment has been successfully switched from the 3CC operation mode to the 2CC operation mode, and may begin to work in the 2CC operation mode.

In a possible implementation, after the operation mode of the user equipment is switched from the 3CC operation mode to the 2CC operation mode, the power consumption of the user equipment may be reduced. If the power consumption of the user equipment is relatively low after the user equipment works in the 2CC operation mode for a period of time, the operation mode of the user equipment may be switched from the 2CC operation mode to the 3CC operation mode. To avoid frequent operation mode switching for the user equipment, when satisfying a condition and currently working in the 2CC operation mode, the user equipment may request the base station to change the transmission mode parameter corresponding to the operation mode of the user equipment to the transmission mode parameter corresponding to the 3CC operation mode, to switch the user equipment from the 2CC operation mode to the 3CC operation mode. Specifically, the operation mode switching method may further include: determining, by the user equipment, that the user equipment satisfies a fourth preset condition, where the fourth preset condition includes: the current data transmission rate of the user equipment is less than a fourth rate threshold, and/or the battery temperature of the user equipment is less than a fourth temperature threshold; determining, by the user equipment, that the user equipment is in the 2CC operation mode; changing, by the user equipment, the transmission mode parameter of the user equipment from the transmission mode parameter corresponding to the current 2CC operation mode to the transmission mode parameter corresponding to the 3CC operation mode; and restarting, by the user equipment, the communications module of the user equipment, and sending a fourth access request to the base station, where the fourth access request carries the transmission mode parameter corresponding to the 3CC operation mode. The fourth rate threshold is greater than the first rate threshold, and the fourth rate threshold is less than the third rate threshold. The fourth temperature threshold is less than the second temperature threshold, and the fourth temperature threshold is less than the third temperature threshold.

In a possible implementation, the transmission mode parameter is the protocol stack version of the user equipment. A method of changing, by the user equipment, the transmission mode parameter of the user equipment from the transmission mode parameter corresponding to the 2CC operation mode to the transmission mode parameter corresponding to the 3CC operation mode may include: changing, by the user equipment, the protocol stack version of the user equipment from a protocol stack version corresponding to the 2CC operation mode to a protocol stack version corresponding to the 3CC operation mode. The transmission mode parameter corresponding to the 2CC operation mode is different from the transmission mode parameter corresponding to the 3CC operation mode.

In a possible implementation, the transmission mode parameter is the identifier that is of the CA combination supported by the user equipment and that is included in the configuration file of the user equipment. By changing the identifier that is of the CA combination supported by the user equipment and that is included in the configuration file, the user equipment may implement, on the user equipment, the operation mode switching for the user equipment. Specifically, the method of changing, by the user equipment, the transmission mode parameter of the user equipment from the transmission mode parameter corresponding to the 2CC operation mode to the transmission mode parameter corresponding to the 3CC operation mode may include: changing, by the user equipment, the identifier that is of the CA combination supported by the user equipment and that is included in the configuration file of the user equipment from a 2CC combination identifier to a 3CC combination identifier.

In a possible implementation, after the user equipment restarts the communications module of the user equipment, and sends the fourth access request to the base station, the method further includes: receiving, by the user equipment, a fourth access response sent by the base station. The fourth access response is used for indicating that the base station has switched the operation mode of the user equipment from the 2CC operation mode to the 3CC operation mode. When receiving the fourth access response sent by the base station, the user equipment may determine that the operation mode of the user equipment has been successfully switched from the 2CC operation mode to the 3CC operation mode, and may begin to work in the 3CC operation mode.

In a possible implementation, that the user equipment satisfies the first preset condition includes: the current data transmission rate of the user equipment is less than the first rate threshold. Before the determining, by user equipment, that the user equipment satisfies a first preset condition, the operation mode switching method provided in the first aspect of embodiments of the present invention further includes: determining, by the user equipment, that the battery temperature of the user equipment is greater than a fifth temperature threshold; and controlling, by the user equipment, the data transmission rate of the user equipment, so that the data transmission rate of the user equipment is less than the first rate threshold. A higher data transmission rate of the user equipment indicates possible higher power consumption of the user equipment, and a possible higher battery temperature of the user equipment. Therefore, when the battery temperature of the user equipment is greater than the fifth temperature threshold, the user equipment may control the data transmission rate of the user equipment, so that the data transmission rate of the user equipment is reduced and is less than the first rate threshold, to satisfy the first preset condition of "switching the operation mode of the user equipment from the CA operation mode to the non-CA operation mode". The fifth temperature threshold may be the same as the first temperature threshold, or may be greater than the first temperature threshold.

According to a second aspect, an embodiment of the present invention provides an operation mode switching method. The method includes: receiving, by a base station, a first access request sent by user equipment, where the first access request carries a transmission mode parameter corresponding to a non-CA operation mode, and the first access request is sent by the user equipment after the user equipment determines that the user equipment satisfies a first preset condition and the user equipment is currently in a CA operation mode; and changing, by the base station, a transmission mode parameter of the user equipment to the transmission mode parameter corresponding to the non-CA operation mode, to switch an operation mode of the user equipment from the CA operation mode to the non-CA operation mode.

When a current data transmission rate of the user equipment is less than a first rate threshold, and the user equipment determines that the user equipment is in the CA operation mode, it indicates that a current service performed by the user equipment has a relatively low requirement on a data transmission rate, and does not require high-speed data transmission to be performed. In other words, it indicates that normal execution of the current service can be ensured when the user equipment currently works in the non-CA operation mode that may provide a relatively low data transmission rate. In this solution, to reduce power consumption of the user equipment, when the current data transmission rate of the user equipment is less than the first rate threshold, the user equipment may change the transmission mode parameter of the user equipment to the transmission mode parameter corresponding to the non-CA operation mode, then restart the communications module of the user equipment, and send the first access request to the base station, where the first access request carries the transmission mode parameter corresponding to the non-CA operation mode, to request the base station to change the transmission mode parameter of the user equipment to the transmission mode parameter corresponding to the non-CA operation mode, so that the user equipment works in the non-CA operation mode.

When the user equipment performs high-speed data transmission, the power consumption of the user equipment is relatively large, and this may cause the battery temperature of the user equipment to be relatively high. When the battery temperature of the user equipment is greater than a value, there may be a security threat. When the user equipment works in the CA operation mode that may provide a relatively high data transmission rate, the power consumption of the user equipment is relatively high, and when the user equipment works in the non-CA operation mode that may provide the relatively low data transmission rate, the power consumption of the user equipment is relatively low. Therefore, to reduce the power consumption of the user equipment, so as to reduce the battery temperature of the user equipment, when the battery temperature of the user equipment is greater than the first temperature threshold, the user equipment may change the transmission mode parameter of the user equipment to the transmission mode parameter corresponding to the non-CA operation mode, restart the communications module, and send the first access request to the base station, to request the base station to change the transmission mode parameter of the user equipment to the transmission mode parameter corresponding to the non-CA operation mode, so that the user equipment works in the non-CA operation mode.

In this solution, the base station may perform operation mode switching for the user equipment and change the transmission mode parameter of the user equipment to the transmission mode parameter corresponding to the non-CA operation mode, only after receiving the first access request sent by the user equipment, to switch the operation mode of the user equipment from the CA operation mode to the non-CA operation mode. The base station does not decide the operation mode of the user equipment.

In a possible implementation, after the base station switches the operation mode of the user equipment from the CA operation mode to the non-CA operation mode, the method further includes: sending, by the base station, the first access response to the user equipment. The first access response is used for indicating that the base station has switched the operation mode of the user equipment from the CA operation mode to the non-CA operation mode. By sending the first access response to the user equipment, the base station may notify that the operation mode of the user equipment has been switched to the non-CA operation mode, so that the user equipment begins to work in the non-CA operation mode.

In a possible implementation, the operation mode switching method further includes: receiving, by the base station, a third access request sent by the user equipment, where the third access request is sent by the user equipment after the user equipment determines that the user equipment satisfies a third preset condition and the user equipment currently works in a 3CC operation mode; and changing, by the base station, a transmission mode parameter of the user equipment to a transmission mode parameter corresponding to a 2CC operation mode, to switch an operation mode of the user equipment from the 3CC operation mode to the 2CC operation mode.

In a possible implementation, after the base station switches the operation mode of the user equipment from the 3CC operation mode to the 2CC operation mode, the method further includes: sending, by the base station, a third access response to the user equipment. The third access response is used for indicating that the base station has switched the operation mode of the user equipment from the 3CC operation mode to the 2CC operation mode. By sending the third access response to the user equipment, the base station may notify that the operation mode of the user equipment has been switched to the non-2CC operation mode, so that the user equipment begins to work in the 2CC operation mode.

In a possible implementation, after the base station switches the operation mode of the user equipment from the CA operation mode to the non-CA operation mode, the operation mode switching method provided in the second aspect of the embodiments of the present invention may further include: receiving, by the base station, a second access request sent by the user equipment, where the second access request is sent by the user equipment after the user equipment determines that the user equipment satisfies a second preset condition and the user equipment currently works in the non-CA operation mode; and changing, by the base station, the transmission mode parameter of the user equipment to a transmission mode parameter corresponding to the CA operation mode, to switch the operation mode of the user equipment from the non-CA operation mode to the CA operation mode. The base station may perform the operation mode switching for the user equipment and switch the operation mode of the user equipment from the non-CA operation mode to the CA operation mode, only after the base station receives the second access request sent by the user equipment. The base station does not decide the operation mode of the user equipment. In this way, the user equipment may automatically detect the current data transmission rate and/or the battery temperature of the user equipment, and when the current data transmission rate of the user equipment is less than the second rate threshold and/or the battery temperature is less than the second temperature threshold, if the user equipment is in the non-CA operation mode, change, on the user equipment, the transmission mode parameter of the user equipment, then restart the communications module of the user equipment, and send the second access request to the base station, to request the base station to change the transmission mode parameter of the user equipment to the transmission mode parameter corresponding to the CA operation mode, so that the base station switches the operation mode of the user equipment from the non-CA operation mode to the CA operation mode.

In a possible implementation, the operation mode switching method further includes: receiving, by the base station, a fourth access request sent by the user equipment, where the fourth access request is sent by the user equipment after the user equipment determines that the current data transmission rate of the user equipment is less than a fourth rate threshold and/or the battery temperature of the user equipment is less than a fourth temperature threshold and the user equipment currently works in the 2CC working mode, and changes the transmission mode parameter of the user equipment from the transmission mode parameter corresponding to the 2CC operation mode to the transmission mode parameter corresponding to the 3CC operation mode; and switching, by the base station, the operation mode of the user equipment from the 2CC operation mode to the 3CC operation mode.

In a possible implementation, after the user equipment restarts the communications module of the user equipment, and sends the second access request to the base station, the operation mode switching method provided in the second aspect of the embodiments of the present invention may further include: sending, by the base station, a second access response to the user equipment. The second access response is used for indicating that the base station has switched the operation mode of the user equipment from the non-CA operation mode to the CA operation mode, and notifying that the user equipment may begin to work in the CA operation mode.

In a possible implementation, after the user equipment sends the fourth access request to the base station, the operation mode switching method further includes: sending, by the base station, a fourth access response to the user equipment. The fourth access response is used for indicating that the base station has switched the operation mode of the user equipment from the 2CC operation mode to the 3CC operation mode, and notifying that the user equipment may begin to work in the 3CC operation mode.

According to a third aspect, an embodiment of the present invention provides user equipment. The user equipment includes: a condition determining module, a changing module, a start module, and a sending module. The condition determining module is configured to determine that the user equipment satisfies a first preset condition, where the first preset condition includes: a current data transmission rate of the user equipment is less than a first rate threshold, and/or a battery temperature of the user equipment is greater than a first temperature threshold. The changing module is configured to: when the user equipment is in a carrier aggregation CA operation mode, change a transmission mode parameter of the user equipment to a transmission mode parameter corresponding to a non-CA operation mode, where the transmission mode parameter of the user equipment is used for representing a data transmission rate of the user equipment, the CA operation mode and the non-CA operation mode are corresponding to different transmission mode parameters, a data transmission rate represented by a transmission mode parameter corresponding to the CA operation mode is greater than a data transmission rate represented by the transmission mode parameter corresponding to the non-CA operation mode. The start module is configured to restart a communications module of the user equipment. The sending module is configured to: after the start module restarts the communications module of the user equipment, send a first access request to a base station, where the first access request carries the transmission mode parameter corresponding to the non-CA operation mode.

In a possible implementation, the transmission mode parameter is a protocol stack version of the user equipment. The changing module is specifically configured to change the protocol stack version of the user equipment from a first version to a second version, where a protocol stack of the first version is corresponding to the CA operation mode, and a protocol stack of the second version is corresponding to the non-CA operation mode.

In a possible implementation, the transmission mode parameter is the identifier that is of the CA combination supported by the user equipment and that is included in the configuration file of the user equipment. The user equipment further includes: a storage module. The storage module is configured to store the configuration file, where the configuration file includes the identifier of the CA combination supported by the user equipment. The changing module is specifically configured to delete the identifier that is of the CA combination supported by the user equipment and that is included in the configuration file stored in the storage module.

In a possible implementation, the user equipment provided in this embodiment of the present invention may further include: a receiving module. The receiving module is configured to receive a first access response sent by the base station. The first access response is used for indicating that the base station has switched the operation mode of the user equipment from the CA operation mode to the non-CA operation mode. When the user equipment receives the first access response sent by the base station, the user equipment may determine that the operation mode of the user equipment has been successfully switched from the CA operation mode to the non-CA operation mode, and may begin to work in the non-CA operation mode.

In a possible implementation, the condition determining module is further configured to: after the sending module sends the first access request to the base station, determine that the user equipment satisfies a second preset condition, where the second preset condition includes: the current data transmission rate of the user equipment is less than a second rate threshold, and the battery temperature of the user equipment is less than a second temperature threshold, where the first rate threshold is greater than the second rate threshold, and the first temperature threshold is greater than the second temperature threshold. The changing module is further configured to change the transmission mode parameter of the user equipment to the transmission mode parameter corresponding to the CA operation mode. The sending module is further configured to: when the start module restarts the communications module of the user equipment, send a second access request to the base station, where the second access request carries the transmission mode parameter corresponding to the CA operation mode.

In a possible implementation, the receiving module is further configured to receive a second access response sent by the base station. The second access response is used for indicating that the base station has switched the operation mode of the user equipment from the non-CA operation mode to the CA operation mode. When receiving the second access response sent by the base station, the user equipment may determine that the operation mode of the user equipment has been successfully switched from the non-CA operation mode to the CA operation mode, and may begin to work in the CA operation mode.

In a possible implementation, the condition determining module may be further configured to determine that the user equipment satisfies a third preset condition. The changing module may be further configured to: when the user equipment is in a 3CC operation mode, change the transmission mode parameter of the user equipment from a transmission mode parameter corresponding to the current 3CC operation mode to a transmission mode parameter corresponding to the 2CC operation mode. The sending module may be further configured to: when the start module restarts the communications module of the user equipment, send a third access request to the base station, where the third access request carries the transmission mode parameter corresponding to the 2CC operation mode.

In a possible implementation, the condition determining module may be further configured to determine that the user equipment satisfies a fourth preset condition. The changing module may be further configured to: when the user equipment is in a 2CC operation mode, change the transmission mode parameter of the user equipment from a transmission mode parameter corresponding to the current 2CC operation mode to a transmission mode parameter corresponding to the 3CC operation mode. The sending module may be further configured to: when the start module restarts the communications module of the user equipment, send a fourth access request to the base station, where the fourth access request carries the transmission mode parameter corresponding to the 3CC operation mode.

According to a fourth aspect, an embodiment of the present invention provides user equipment, including: a processor, a memory, a bus, and a communications interface. The processor, the memory, and the communications interface are connected to each other by using the bus. The memory is configured to store computer program code. The computer program code includes an instruction. When the processor of the user equipment executes the instruction, the user equipment performs the operation mode switching method according to the first aspect and the various possible implementations of the first aspect.

According to a fifth aspect, an embodiment of the present invention provides a computer storage medium. The computer storage medium stores computer program code, and the computer program code includes an instruction. When a processor of user equipment executes the instruction, the user equipment performs the operation mode switching method according to the first aspect and the various possible implementations of the first aspect.

For detailed descriptions and corresponding technical effect analyses of the modules of the user equipment in the third aspect and the fourth aspect, refer to the detailed descriptions in the first aspect and the various possible implementations of the first aspect. Details are not described herein again in the embodiments of the present invention.

According to a sixth aspect, an embodiment of the present invention provides a base station. The base station includes: a receiving module and a switching module. The receiving module is configured to receive a first access request sent by user equipment. The first access request is sent by the user equipment after the user equipment determines that the user equipment is in a CA operation mode and determines that the user equipment satisfies a first preset condition. The switching module is configured to change a transmission mode parameter of the user equipment to the transmission mode parameter corresponding to the non-CA operation mode, to switch an operation mode of the user equipment from the CA operation mode to the non-CA operation mode.

In a possible implementation, the receiving module is further configured to: after the switching module switches the operation mode of the user equipment from the CA operation mode to the non-CA operation mode, receive a second access request sent by the user equipment. The second access request is sent by the user equipment after the user equipment determines that the user equipment satisfies a second preset condition and determines that the user equipment is in the non-CA operation mode, and the first temperature threshold is greater than the second temperature threshold. The switching module is further configured to: after the receiving module receives the second access request, change the transmission mode parameter of the user equipment to the transmission mode parameter corresponding to the CA operation mode, to switch the operation mode of the user equipment from the non-CA operation mode to the CA operation mode.

In a possible implementation, the base station provided in this embodiment of the present invention may further include: a sending module. The sending module is configured to send a first access response to the user equipment. The first access response is used for indicating that the base station has switched the operation mode of the user equipment from the CA operation mode to the non-CA operation mode.

In a possible implementation, the sending module is further configured to send a second access response to the user equipment. The second access response is used for indicating that the base station has switched the operation mode of the user equipment from the non-CA operation mode to the CA operation mode.

For detailed descriptions of the first preset condition, the second preset condition, the third preset condition, and the fourth preset condition in the second aspect, the third aspect, and the sixth aspect, refer to related descriptions in the first aspect. Details are not described herein again.

According to a seventh aspect, a base station is provided, including: a processor, a memory, a bus, and a communications interface. The processor, the memory, and the communications interface are connected to each other by using the bus. The memory is configured to store computer program code. The computer program code includes an instruction. When the processor of the base station executes the instruction, the base station performs the operation mode switching method according to the second aspect and the various possible implementations of the second aspect.

According to an eighth aspect, an embodiment of the present invention provides a computer storage medium. The computer storage medium stores computer program code, and the computer program code includes an instruction. When a processor of a base station executes the instruction, the base station performs the operation mode switching method according to the second aspect and the various possible implementations of the second aspect.

For detailed descriptions and corresponding technical effect analyses of the modules in the base station in the sixth aspect and the seventh aspect, refer to the detailed descriptions in the second aspect and the various possible implementations of the second aspect. Details are not described herein again in the embodiments of the present invention.

DESCRIPTION OF EMBODIMENTS

An operation mode switching method may be applied to a process of operation mode switching for user equipment. In embodiments of the present invention, an operation mode of the user equipment may include a carrier aggregation (English: Carrier Aggregation, CA for short) operation mode and a non-CA operation mode. The CA operation mode may include a 3 component carrier (English: Component Carrier, CC for short) operation mode and a 2CC operation mode. The 2CC means that carrier aggregation is performed on two contiguous or non-contiguous component carriers, and the 3CC means that carrier aggregation is performed on three contiguous or non-contiguous component carriers.

A transmission mode parameter corresponding to the CA operation mode is different from a transmission mode parameter corresponding to the non-CA operation mode. A transmission mode parameter of the user equipment is used for representing a data transmission rate of the user equipment. A data transmission rate represented by the transmission mode parameter corresponding to the CA operation mode is greater than a data transmission rate represented by the transmission mode parameter corresponding to the non-CA operation mode. For example, a data transmission rate represented by a transmission mode parameter corresponding to the 2CC operation mode in the CA operation mode is 300 million bits per second (English: Million bits per second, Mbps for short), and the data transmission rate represented by the transmission mode parameter corresponding to the non-CA operation mode may be 150 Mbps.

Figure 1:
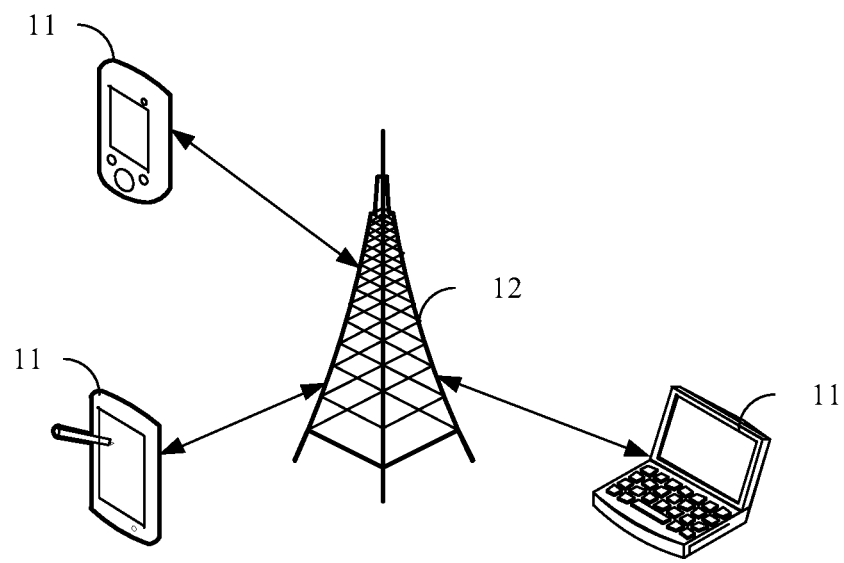
FIG. 1 is a schematic structural diagram of a network to which an operation mode switching method is applied according to an embodiment of the present invention.

FIG. 1 is a schematic structural diagram of a network to which an operation mode switching method is applied. As shown in FIG. 1, the network to which the operation mode switching method is applied includes at least one user equipment 11 and a base station 12.

In this embodiment of the present invention, the operation mode switching method is described by using an example in which operation mode switching for the user equipment 11 is implemented through interaction between one user equipment 11 and the base station 12.

The user equipment 11 may send an access request to the base station 12 after being powered off. The base station 12 may send an access response to the user equipment after receiving the access request sent by the user equipment 11. The access response may carry operation mode indication information of the user equipment 11. For example, the access request may carry a transmission mode parameter corresponding to a CA operation mode. The user equipment 11 may determine, based on the transmission mode parameter that is corresponding to the CA operation mode and that is carried in the access response, that the user equipment 11 works in the CA operation mode. Certainly, when the user equipment 11 performs capability reporting, the base station 12 may send the access response to the user equipment 11 only when determining that the user equipment 11 supports the CA operation mode. The access response carries the transmission mode parameter corresponding to the CA operation mode. During a process in which the user equipment 11 performs data communication, the base station 12 may send a non-CA operation mode switching message to the user equipment 11 based on a data transmission rate of the user equipment 11 (for example, the data transmission rate of the user equipment is less than a value) and a current network status (for example, a current network interference status in a network). The switching message may carry a transmission mode parameter corresponding to the non-CA operation mode. The user equipment 11 supports the CA operation mode, and a data transmission rate represented by the transmission mode parameter corresponding to the CA operation mode is greater than a data transmission rate represented by the transmission mode parameter corresponding to the non-CA operation mode. Therefore, after receiving the switching message, the user equipment 11 may control a transmission mode parameter of the user equipment 11 to be downward compatible with the transmission mode parameter corresponding to the non-CA operation mode, to work in the non-CA operation mode.

For example, the user equipment 11 may be a terminal device supporting a CA technology, such as a mobile phone, mobile wireless fidelity (English: Mobile Wi-Fi), a data card, a portable computer, and a wireless communications module.

Figure 2:
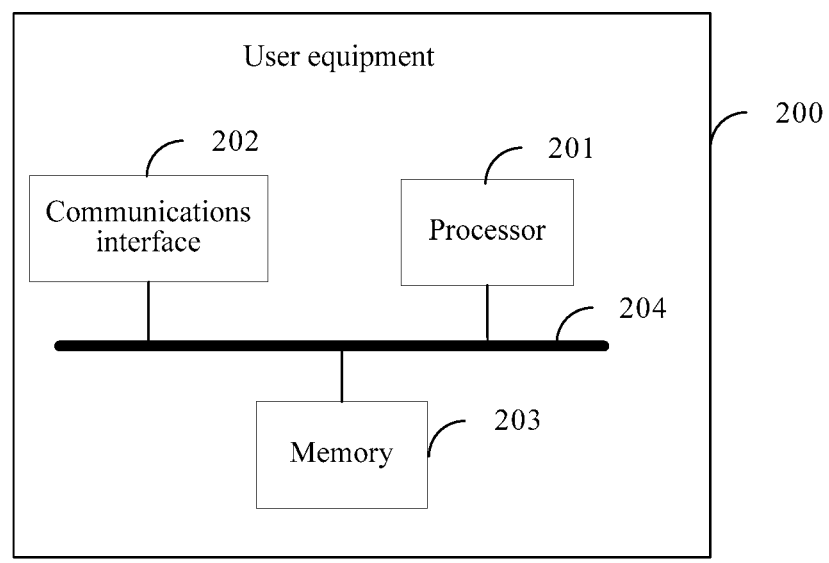
FIG. 2 is a possible schematic structural diagram of user equipment according to an embodiment of the present invention.

FIG. 2 is a schematic structural diagram of user equipment according to an embodiment of the present invention. The user equipment provided in this embodiment of the present invention may be configured to implement methods in the embodiments of the present invention. For ease of description, only parts related to this embodiment of the present invention are shown. For specific technical details that are not disclosed, refer to subsequent embodiments of the present invention.

Specifically, the user equipment may include: a processor, a communications interface, a memory, and a bus. As shown in FIG. 2, the user equipment 200 includes: the processor 201, the communications interface 202, the memory 203, and the bus 204. The processor 201, the communications interface 202, and the memory 203 are connected to each other by using the bus 204. The bus 204 may be classified into an address bus, a data bus, a control bus, and the like. For ease of representation, only one thick line is used to represent the bus in FIG. 2, but this does not mean that there is only one bus or only one type of bus.

Figure 3:
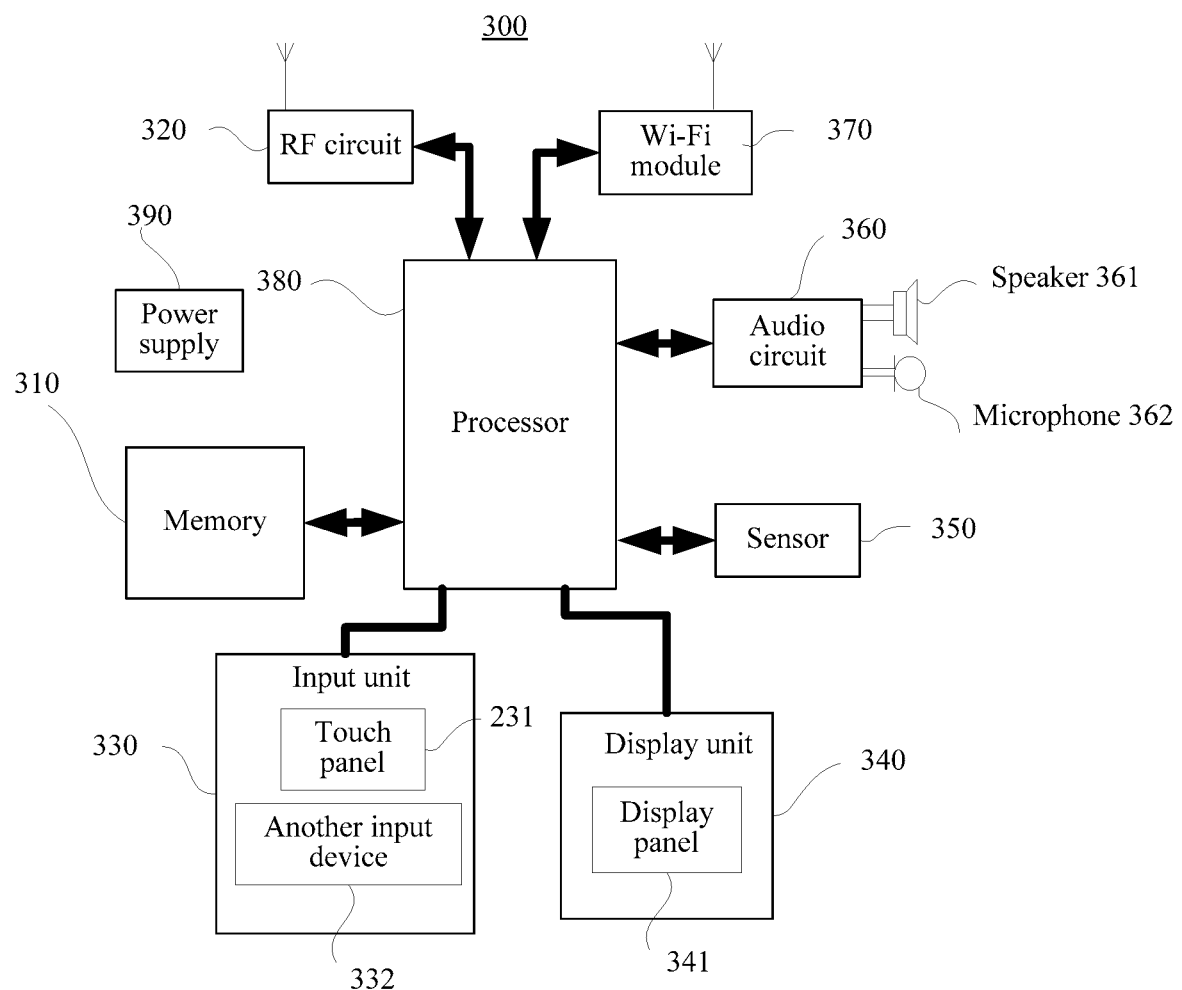
FIG. 3 is a possible schematic structural diagram of a mobile phone according to an embodiment of the present invention.

For example, herein in this embodiment of the present invention, descriptions are provided by using an example in which the user equipment is a mobile phone. FIG. 3 is a block diagram of a partial structure of a mobile phone 300 related to the embodiments of the present invention. The mobile phone 300 in FIG. 3 includes parts such as a radio frequency (English: Radio Frequency, RF for short) circuit 330, a memory 330, an input unit 319, a display unit 340, a sensor 350, an audio circuit 360, a wireless fidelity (English: wireless fidelity, Wi-Fi for short) module 370, a processor 380, and a power supply 390. A person skilled in the art may understand that a structure of the mobile phone shown in FIG. 3 does not constitute a limitation on the mobile phone, and the mobile phone may include more or fewer components than those shown in the figure, or some components may be combined, or different component arrangements may be used.

The RF circuit 310 may be configured to receive and send a signal during an information receiving and sending process, and may further communicate with a network and another device through wireless communication, for example, send a service request to the another device or receive a response message sent by the another device. The memory 320 may be configured to store a software program, a module, data information, and a data file. For example, the memory 320 may be configured to store a configuration file that is in the mobile phone 300 and that is related to an operation mode of the mobile phone 300, and a service request sent by the RF circuit 310 to the another device or a response message that is received by the RF circuit 310 and sent by the another device.

The input unit 330 may be configured to: receive entered text or a character, and generate a signal input related to a user setting and function control of the mobile phone 200. For example, the input unit 330 may be configured to receive a user input, to modify information (a signal) that is related to the operation mode of the mobile phone 300 and that is in the configuration file of the mobile phone 300 stored in the memory 320. Specifically, the input unit 330 may include a touch panel 331 and another input device 332. Specifically, the another input device 332 may include, but is not limited to, one or more of a physical keyboard, a functional key (such as a volume control key or a switch key), a trackball, a mouse, and a joystick.

The display unit 340 may be configured to display information entered by a user or information provided for the user, and various menus of the mobile phone 300. The display unit 340 may include a display panel 341. Optionally, the display panel 341 may be configured by using a liquid crystal display (English: Liquid Crystal, LCD Display for short), an organic light-emitting diode (English: Organic Light-Emitting Diode, OLED for short), or the like. Further, the touch panel 331 may cover the display panel 341. After detecting a touch operation on or near the touch panel 331, the touch panel 331 transfers the touch operation to the processor 380, to determine a type of a touch event. The processor 280 then provides a corresponding visual output on the display panel 341 according to the type of the touch event.

Although, in FIG. 3, the touch panel 331 and the display panel 341 are used as two separate parts to implement input and output functions of the mobile phone 300, in some embodiments, the touch panel 331 and the display panel 341 may be integrated to implement the input and output functions of the mobile phone 300.

The mobile phone 300 may further include at least one sensor 350, such as an optical sensor, a motion sensor, and another sensor. The audio circuit 360, a speaker 361, and a microphone 362 may provide audio interfaces between the user and the mobile phone 300.

It should be noted that, the RF circuit 330 and/or the Wi-Fi module 370 may be a communications interface of the mobile phone 300.

According to the operation mode switching methods provided in the embodiments of the present invention, the user equipment may automatically detect a current data transmission rate and/or a battery temperature of the user equipment, and after the current data transmission rate and/or the battery temperature of the user equipment satisfies a condition, may switch an operation mode of the user equipment by changing a transmission mode parameter of the user equipment.

Figure 4:
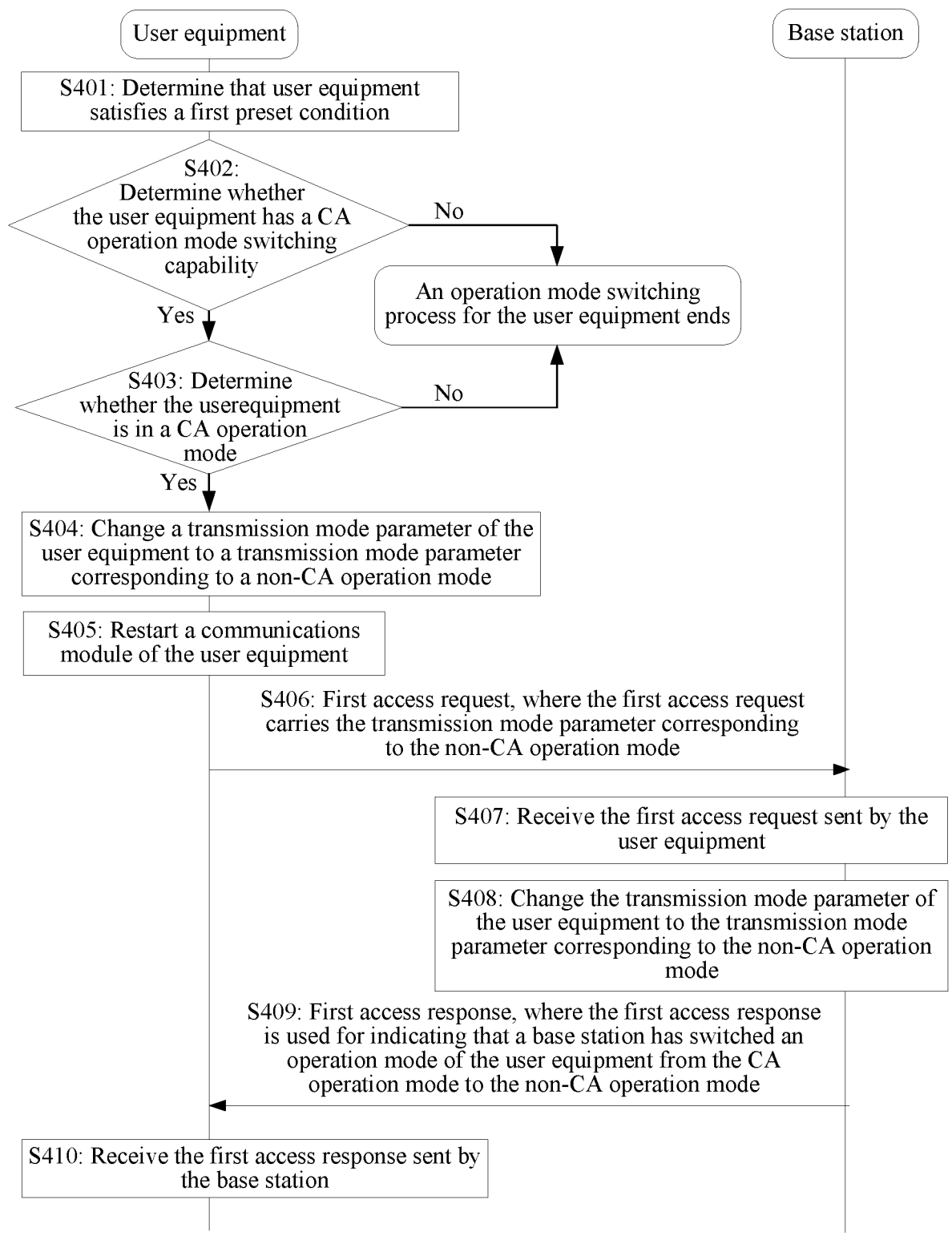
FIG. 4 is a flowchart of an operation mode switching method according to an embodiment of the present invention.

The following describes an operation mode switching method and user equipment according to the embodiments of the present invention in detail with reference to the accompanying drawings by using specific embodiments and application scenarios thereof:

An embodiment of the present invention provides an operation mode switching method. As shown in FIG. 4, the operation mode switching method may include the following steps.

S401: A processor 201 determines that user equipment satisfies a first preset condition.

The first preset condition includes: a current data transmission rate of the user equipment is less than a first rate threshold, and/or a battery temperature of the user equipment is greater than a first temperature threshold.

For example, when the current data transmission rate of the user equipment is less than the first rate threshold, the user equipment may determine that the user equipment satisfies the first preset condition; or when the battery temperature of the user equipment is greater than the first temperature threshold, the processor 201 may determine that the user equipment satisfies the first preset condition; or when the current data transmission rate of the user equipment is less than the first rate threshold, and the battery temperature of the user equipment is greater than the first temperature threshold, the processor 201 may determine that the user equipment satisfies the first preset condition.

The battery temperature of the user equipment may further be a temperature of a component in the user equipment. For example, the component may be a central processing unit (English: Central Processing Unit, CPU for short) in the user equipment.

S402: The processor 201 determines whether the user equipment has a CA operation mode switching capability.

For example, the processor 201 may determine, by using a configuration file of the user equipment stored in the memory 203, whether the user equipment has the CA operation mode switching capability. The configuration file of the user equipment may store switching capability indication information of the user equipment. The switching capability indication information may be used for indicating whether the user equipment has the CA operation mode switching capability. For example, the switching capability indication information may be at least one piece of bit information. It is assumed that the switching capability indication information is one piece of bit information. When the switching capability indication information is "1", it indicates that the user equipment has the CA operation mode switching capability. When the switching capability indication information is "0", it indicates that the user equipment does not have the CA operation mode switching capability.

Specifically, if the user equipment has the CA operation mode switching capability, proceed to S203. If the user equipment does not have the CA operation mode switching capability, an operation mode switching process of the user equipment ends.

S403: The processor 201 determines whether the user equipment is in a CA operation mode.

For example, in an implementation of this embodiment of the present invention, the processor 201 may determine, by using a version of a protocol stack in which the user equipment works, whether the user equipment is in the CA operation mode.

The user equipment may work in different protocol stacks, and operation modes corresponding to the protocol stacks are different. It is assumed that, a protocol stack of a first version is corresponding to the CA operation mode, and a protocol stack of a second version is corresponding to a non-CA operation mode. For example, the protocol stack of the first version is a release 10, and the release 10 supports a 2CC operation mode (that is a CA operation mode); the protocol stack of the second version is a release 9, and the release 9 supports the non-CA operation mode. When determining that the user equipment works in the protocol stack (the release 10) of the first version, the processor 201 may determine that the user equipment is in the CA operation mode. When determining that the user equipment works in the protocol stack (the release 9) of the second version, the processor 201 may determine that the user equipment is in the non-CA operation mode.

In another implementation of this embodiment of the present invention, the processor 201 may determine, by using the configuration file stored in the memory 203, whether the user equipment is in the CA operation mode. The memory 203 stores the configuration file of the user equipment, the configuration file includes an identifier of a CA combination supported by the user equipment, and the configuration file may be used for indicating to the processor 201: an operation mode of the user equipment, so that the user equipment works in the operation mode indicated by the configuration file. Therefore, the processor 201 may view the configuration file of the user equipment. When the configuration file of the user equipment includes the identifier of the CA combination supported by the user equipment, it indicates that the user equipment works in the CA operation mode. When the configuration file of the user equipment does not include the identifier of the CA combination supported by the user equipment, it indicates that the user equipment works in the non-CA operation mode.

When the user equipment works in the CA operation mode, a data transmission rate of the user equipment is relatively high, but power consumption of the user equipment is also relatively high due to the relatively high data transmission rate of the user equipment, consequently causing the battery temperature of the user equipment to be relatively high. When the user equipment works in the non-CA operation mode, a data transmission rate of the user equipment is relatively low, and the battery temperature of the user equipment is also relatively low. Therefore, when the user equipment does not need to perform high-speed data transmission for a long time, normal execution of the current service can be ensured when the user equipment works in the non-CA operation mode that may provide a relatively low data transmission rate. In this way, when the current data transmission rate of the user equipment is less than the first rate threshold, and the user equipment is in the CA operation mode, the operation mode of the user equipment may be switched from the CA operation mode to the non-CA operation mode.

When the user equipment performs high-speed data transmission, the power consumption of the user equipment is relatively large, and this may cause the battery temperature of the user equipment to be relatively high. When the battery temperature of the user equipment is greater than a value, power-off is triggered, and even there may be a security threat. To reduce a possibility that a security accident occurs on the user equipment, the processor 201 may reduce the battery temperature of the user equipment by reducing the power consumption of the user equipment. In this way, when the battery temperature of the user equipment is greater than the first temperature threshold, and the user equipment is in the CA operation mode, the processor 201 may switch the CA operation mode of the user equipment to the non-CA operation mode that has relatively low power consumption.

In other words, the processor 201 may automatically detect the current data transmission rate and/or the battery temperature of the user equipment, and when the current data transmission rate of the user equipment is less than the first rate threshold and/or the battery temperature is greater than the first temperature threshold, if the user equipment is in the CA operation mode, proceed to S404; when the user equipment is in the non-CA operation mode, the operation mode switching process of the user equipment ends.

S404: The processor 201 changes a transmission mode parameter of the user equipment to a transmission mode parameter corresponding to a non-CA operation mode.

Figure 5:
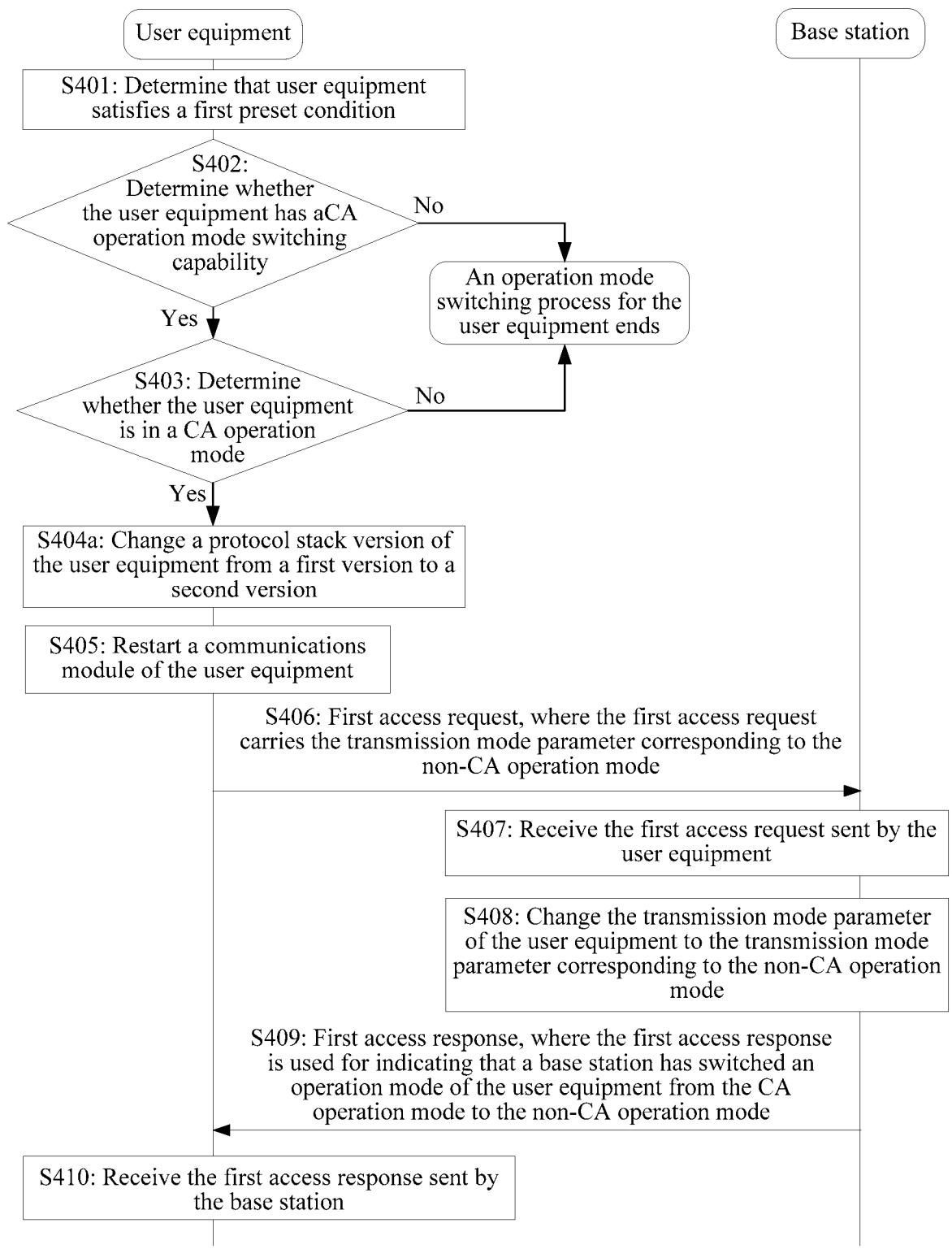
FIG. 5 is a flowchart of another operation mode switching method according to an embodiment of the present invention.

Optionally, in a first application scenario provided in this embodiment of the present invention, the transmission mode parameter may be a protocol stack version of the user equipment. A manner in which the processor 201 changes the protocol stack version of the user equipment is changing the transmission mode parameter of the user equipment to the transmission mode parameter corresponding to the non-CA operation mode. Specifically, as shown in FIG. 5, S404 in FIG. 4 may be replaced with S404*a*:

S404*a*: The processor 201 changes a protocol stack version of the user equipment from a first version to a second version.

The user equipment may work in different protocol stacks, transmission mode parameters corresponding to the protocol stacks are different, and the different transmission mode parameters are corresponding to the different operation modes; and the transmission mode parameters may be the protocol stack version of the user equipment. Therefore, the processor 201 may change a transmission mode parameter of the user equipment by changing the protocol stack version of the user equipment, thereby switching the operation mode of the user equipment.

For example, a protocol stack of the first version is corresponding to the CA operation mode, and a protocol stack of the second version is corresponding to the non-CA operation mode. A transmission mode parameter of the protocol stack of the first version is different from a transmission mode parameter of the protocol stack of the second version, in other words, a transmission mode parameter corresponding to the CA operation mode is different from a transmission mode parameter corresponding to the non-CA operation mode. For example, when the protocol stack of the first version is a release 10, the release 10 supports the 2CC operation mode (that is a CA operation mode), a data capability category of the release 10 is a category (English: Category, CAT for short) 6, and a data transmission rate represented by a transmission mode parameter of the CAT 6 is 300 million bits per second Mbps. When the protocol stack of the second version is a release 9, the release 9 supports the non-CA operation mode, a data capability category of the release 9 is a CAT 4, and a data transmission rate represented by a transmission mode parameter of the CAT 4 is 150 Mbps.

The processor 201 may change the protocol stack version of the user equipment from the release 10 to the release 9, and then may change the transmission mode parameter of the user equipment from a transmission mode parameter (representing a data transmission rate of 300 Mbps) corresponding to the 2CC operation mode (that is a CA operation mode) to a transmission mode parameter (representing a data transmission rate of 150 Mbps) corresponding to the non-CA operation mode.

Figure 6:
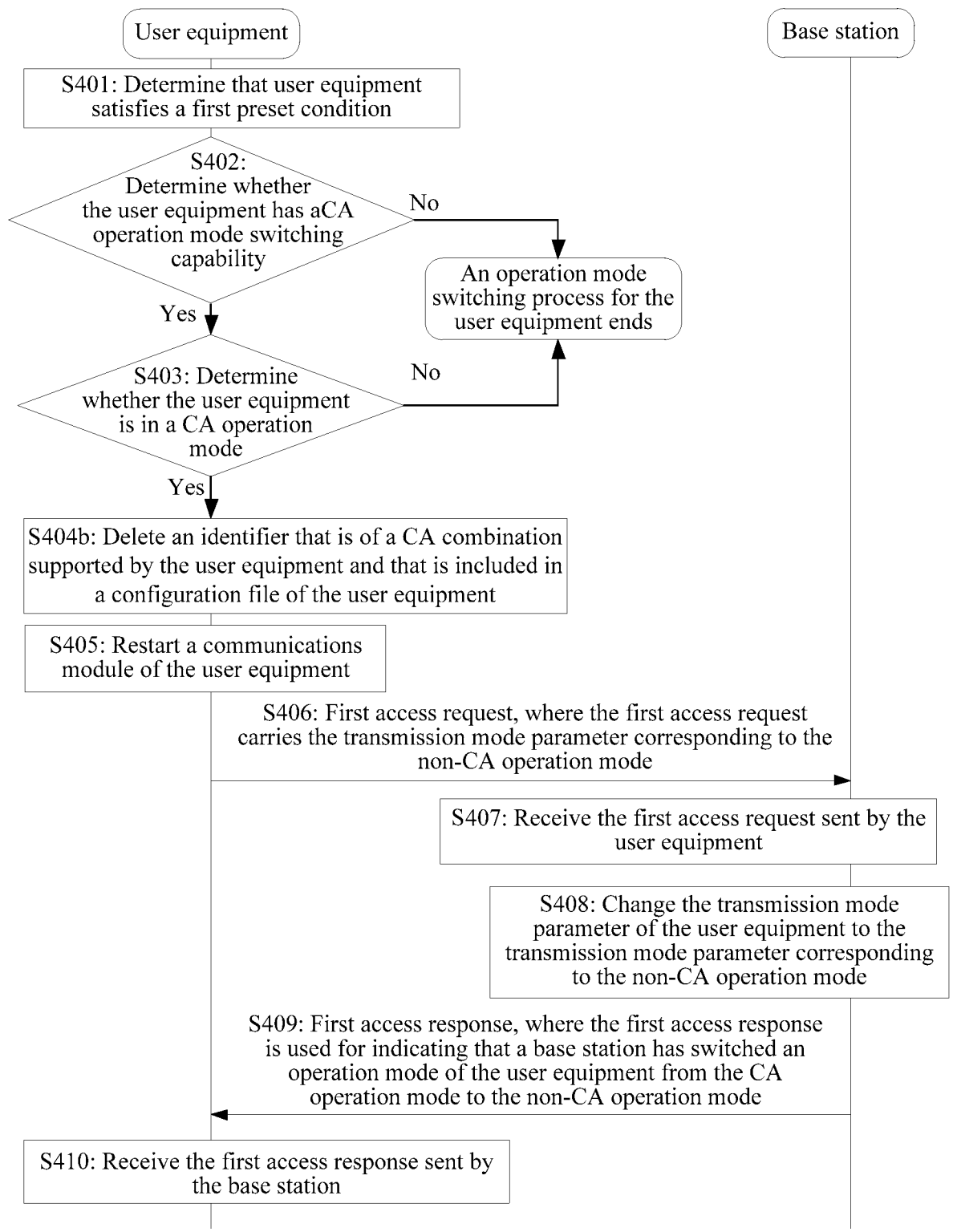
FIG. 6 is a flowchart of another operation mode switching method according to an embodiment of the present invention.

Optionally, in a second application scenario provided in this embodiment of the present invention, the transmission mode parameter is the identifier that is of the CA combination supported by the user equipment and that is included in the configuration file of the user equipment. The memory 203 stores the configuration file of the user equipment, the configuration file includes the identifier of the CA combination supported by the user equipment, and the configuration file may be used for indicating the operation mode of the user equipment, so that the processor 201 enables the user equipment to work in the operation mode indicated by the configuration file; and the transmission mode parameter may be the identifier that is of the CA combination supported by the user equipment and that is included in the configuration file of the user equipment. Therefore, by changing the identifier that is of the CA combination supported by the user equipment and that is included in the configuration file, the processor 201 may implement, on the user equipment, the operation mode switching for the user equipment. Specifically, as shown in FIG. 6, S404 in FIG. 4 may be replaced with S404*b*:

S404*b*: The processor 201 deletes an identifier that is of a CA combination supported by the user equipment and that is included in a configuration file of the user equipment.

After the processor 201 deletes the identifier that is of the CA combination supported by the user equipment and that is included in the configuration file of the user equipment, the configuration file of the user equipment does not include the identifier of the CA combination, and it indicates that currently the user equipment cannot work in the CA operation mode. In this way, the processor 201 may implement, on the user equipment, the operation mode switching for the user equipment, so that the user equipment works in the non-CA operation mode, and changes the transmission mode parameter of the user equipment to the transmission mode parameter corresponding to the non-CA operation mode.

For example, the identifier of the CA combination may be a combination identifier of a carrier of the CA operation mode supported by the user equipment. For example, if the user equipment supports a 3CC operation mode, the identifier of the CA combination included in the configuration file of the user equipment may be B1+B2+B3. B1, B2, and B3 are used for indicating three carriers aggregated in the 3CC operation mode. If the user equipment supports the 2CC operation mode, the identifier of the CA combination included in the configuration file of the user equipment may be B1+B3. B1 and B3 are used for indicating two carriers aggregated in the 2CC operation mode.

Using an example in which the user equipment supports the 3CC operation mode, in this case, the identifier of the CA combination included in the configuration file of the user equipment may be B1+B2+B3. The processor 201 may delete "B1+B2+B3" included in the configuration file of the user equipment. In this way, the configuration file of the user equipment does not include the identifier of the CA combination supported by the user equipment, and it indicates that currently the user equipment cannot work in the CA operation mode. In this way, the processor 201 may switch, on the user equipment, the operation mode of the user equipment to the non-CA operation mode.

Optionally, the identifier of the CA combination may alternatively be a quantity of carriers aggregated in the CA operation mode supported by the user equipment. For example, if the user equipment supports the 3CC operation mode, the identifier of the CA combination included in the configuration file of the user equipment may be 3 (that may be indicated by using a two-bit binary number 11); if the user equipment supports the 2CC operation mode, the identifier of the CA combination included in the configuration file of the user equipment may be 2 (that may be indicated by using a two-bit binary number 10).

Using an example in which the user equipment supports the 3CC operation mode, in this case, the identifier of the CA combination included in the configuration file of the user equipment may be "11", and the processor 201 may switch, on the user equipment, the operation mode of the user equipment to the non-CA operation mode by changing "11" included in the configuration file of the user equipment to "00" or deleting "11" included in the configuration file of the user equipment.

S405: The processor 201 restarts a communications module of the user equipment.

The communications module of the user equipment may be a modulator-demodulator (English: Modulator-DEModulator, MODEM for short) of the user equipment. That the processor 201 restarts the MODEM of the user equipment may be specifically that the processor 201 restarts a protocol stack of the user equipment.

The user equipment may restart the protocol stack of the user equipment after changing the transmission mode parameter of the user equipment from the transmission mode parameter corresponding to the CA operation mode to the transmission mode parameter corresponding to the non-CA operation mode. In this case, the user equipment may work in the protocol stack of the second version, namely, a protocol stack corresponding to the non-CA operation mode.

S406: The processor 201 sends a first access request to a base station by using a communications interface 202, where the first access request carries the transmission mode parameter corresponding to the non-CA operation mode.

The first access request carries the transmission mode parameter corresponding to the non-CA operation mode. Therefore, the first access request may be used for requesting the base station to change, on a base station side, the transmission mode parameter of the user equipment to the transmission mode parameter corresponding to the non-CA operation mode. In this way, the operation mode of the user equipment may be switched from the CA operation mode to the non-CA operation mode.

In the first application scenario, the transmission mode parameter is the protocol stack version of the user equipment. The user equipment sends the first access request to the base station. The first access request carries the transmission mode parameter corresponding to the non-CA operation mode. In other words, the first access request carries the protocol stack (such as the release 9) of the second version.

In the second application scenario, the transmission mode parameter is the identifier that is of the CA combination supported by the user equipment and that is included in the configuration file of the user equipment. After the user equipment deletes the identifier that is of the CA combination supported by the user equipment and that is included in the configuration file of the user equipment, the configuration file of the user equipment does not include the identifier of the CA combination, and it indicates that currently the user equipment can work in the non-CA operation mode. The user equipment sends the first access request to the base station. The first access request carries the transmission mode parameter corresponding to the non-CA operation mode. In other words, the first access request carries the configuration file of the user equipment that does not include the identifier of the CA combination.

S407: The base station receives the first access request sent by the processor 201 of the user equipment by using the communications interface 202.

S408: The base station changes the transmission mode parameter of the user equipment to the transmission mode parameter corresponding to the non-CA operation mode.

The first access request carries the transmission mode parameter corresponding to the non-CA operation mode. Therefore, after receiving the first access request, the base station may change, on the base station side, the transmission mode parameter of the user equipment to the transmission mode parameter corresponding to the non-CA operation mode. In this way, the operation mode of the user equipment may be switched from the CA operation mode to the non-CA operation mode.

It should be noted that, in this embodiment of the present invention, for a method of changing, on the base station side, the transmission mode parameter of the user equipment by the base station, refer to the related descriptions about changing, on the user equipment, the transmission mode parameter of the user equipment by the user equipment in the foregoing embodiment. Details are not described herein again in this embodiment of the present invention.

According to the operation mode switching method provided in this embodiment of the present invention, the user equipment may automatically detect the current data transmission rate and/or the battery temperature of the user equipment, and when the current data transmission rate of the user equipment is less than the first rate threshold and/or the battery temperature is greater than the first temperature threshold, change, on the user equipment, the transmission mode parameter of the user equipment if the user equipment is in the CA operation mode. The user equipment restarts the protocol stack of the user equipment, and sends the first access request to the base station, to switch the operation mode of the user equipment from the CA operation mode to the non-CA operation mode.

After the base station switches the operation mode of the user equipment from the CA operation mode to the non-CA operation mode, the base station may notify the user equipment that the operation mode has been switched. As shown in FIG. 4, the operation mode switching method may further include S409-S410.

S409: The base station sends a first access response to the communications interface 202 of the user equipment, where the first access response is used for indicating that the base station has switched the operation mode of the user equipment from the CA operation mode to the non-CA operation mode.

After switching the operation mode of the user equipment from the CA operation mode to the non-CA operation mode, the base station may send the first access response to the user equipment, to indicate to the user equipment that the base station has switched the operation mode of the user equipment from the CA operation mode to the non-CA operation mode, to enable the user equipment to begin to work in the non-CA operation mode.

S410: The processor 201 receives, by using the communications interface 202, the first access response sent by the base station.

The base station sends the first access response to the user equipment, and then the user equipment may receive the first access response sent by the base station, and begin to work in the non-CA operation mode.

Further, after the user equipment works in the non-CA operation mode for a period of time, power consumption of the user equipment is reduced, and the processor 201 may switch the operation mode of the user equipment from the non-CA operation mode to the CA operation mode. Specifically, a method according to an embodiment of the present invention may further include S701-S710. For example, after the processor 201 switches the operation mode of the user equipment from the CA operation mode to the non-CA operation mode, the power consumption of the user equipment may be reduced. If the power consumption of the user equipment is relatively low after the user equipment works in the non-CA operation mode for a period of time, the processor 201 may switch the operation mode of the user equipment from the non-CA operation mode to the CA operation mode. After S410, the method according to this embodiment of the present invention may further include S701-S710.

S701: The processor 201 determines that the user equipment satisfies a second preset condition.

The second preset condition includes: a current data transmission rate of the user equipment is less than a second rate threshold, and/or a battery temperature of the user equipment is less than a second temperature threshold.

For example, when the current data transmission rate of the user equipment is less than the second rate threshold, the processor 201 may determine that the user equipment satisfies the second preset condition; or when the battery temperature of the user equipment is less than the second temperature threshold, the processor 201 may determine that the user equipment satisfies the second preset condition.

Further, to ensure normal execution of the current service, and also to avoid frequent operation mode switching for the user equipment due to a change of the current data transmission rate or the battery temperature of the user equipment, when the current data transmission rate of the user equipment is less than the second rate threshold and the battery temperature of the user equipment is less than the second temperature threshold, the processor 201 may determine that the user equipment satisfies the second preset condition. The first rate threshold is greater than the second rate threshold, and the first temperature threshold is greater than the second temperature threshold.

S702: The processor 201 determines whether the user equipment has the CA operation mode switching capability.

The processor 201 may determine, by using the configuration file of the user equipment, whether the user equipment has the CA operation mode switching capability.

For a detailed description of S702 in this embodiment of the present invention, refer to the related description of S402 in the foregoing embodiment. Details are not described herein again in this embodiment of the present invention.

S703: The processor 201 determines whether the user equipment is in the non-CA operation mode.

The processor 201 may determine, by using a version of a protocol stack in which the user equipment works, whether the user equipment is in the non-CA operation mode. The processor 201 may further determine, by using the configuration file of the user equipment, whether the user equipment is in the non-CA operation mode. A method of determining, by the processor 201, whether the user equipment is in the non-CA operation mode is similar to the method of "determining whether the user equipment is in the CA operation mode" in S403. Details are not described herein again in this embodiment of the present invention.

Specifically, if the user equipment is in the non-CA operation mode, proceed to S704; when the user equipment is in the CA operation mode, the operation mode switching process of the user equipment ends.

S704: The processor 201 changes the transmission mode parameter of the user equipment to the transmission mode parameter corresponding to the CA operation mode.

Figure 7A:
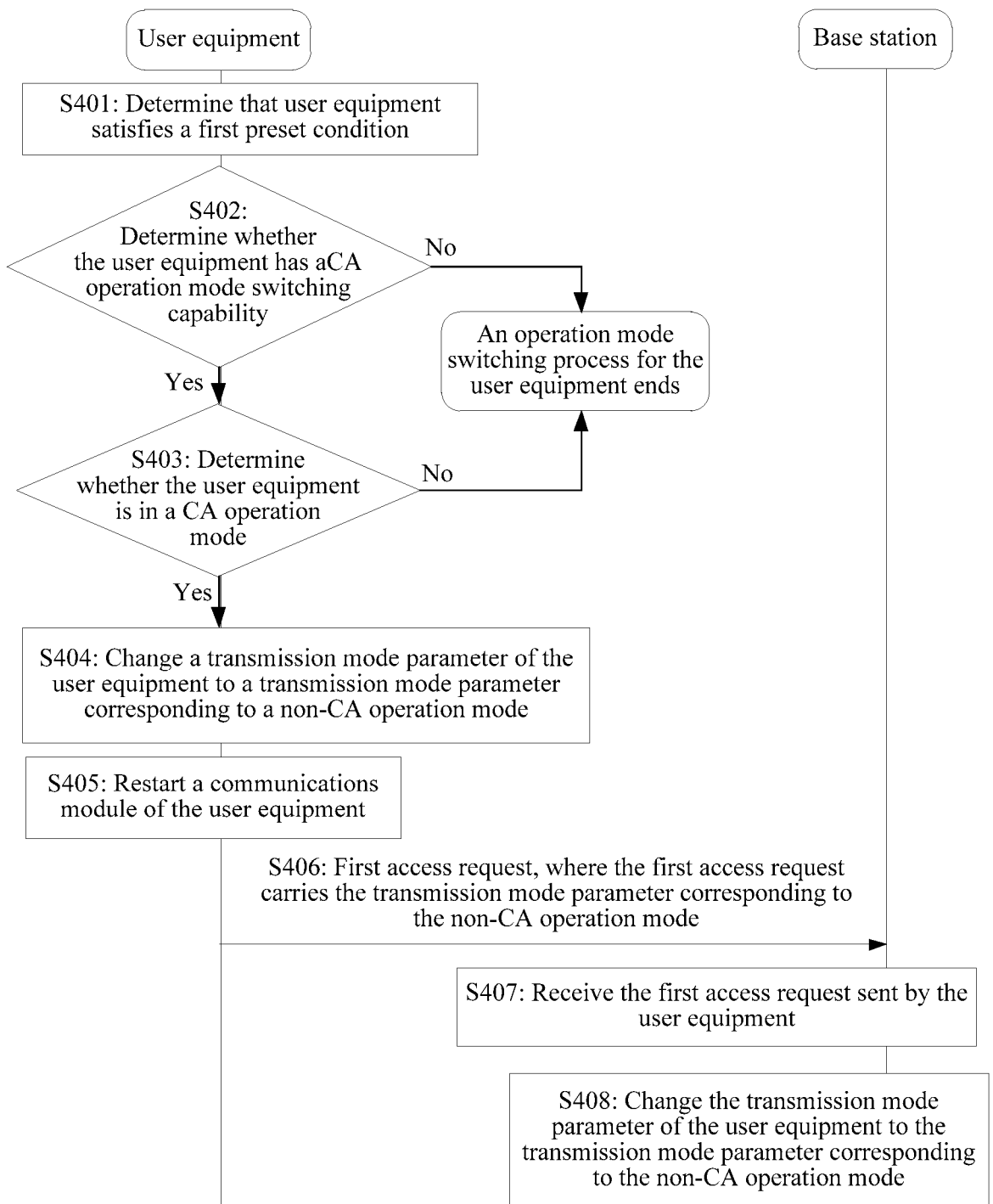
FIG. 7A and FIG. 7B are a flowchart of another operation mode switching method according to an embodiment of the present invention.
Figure 7B:
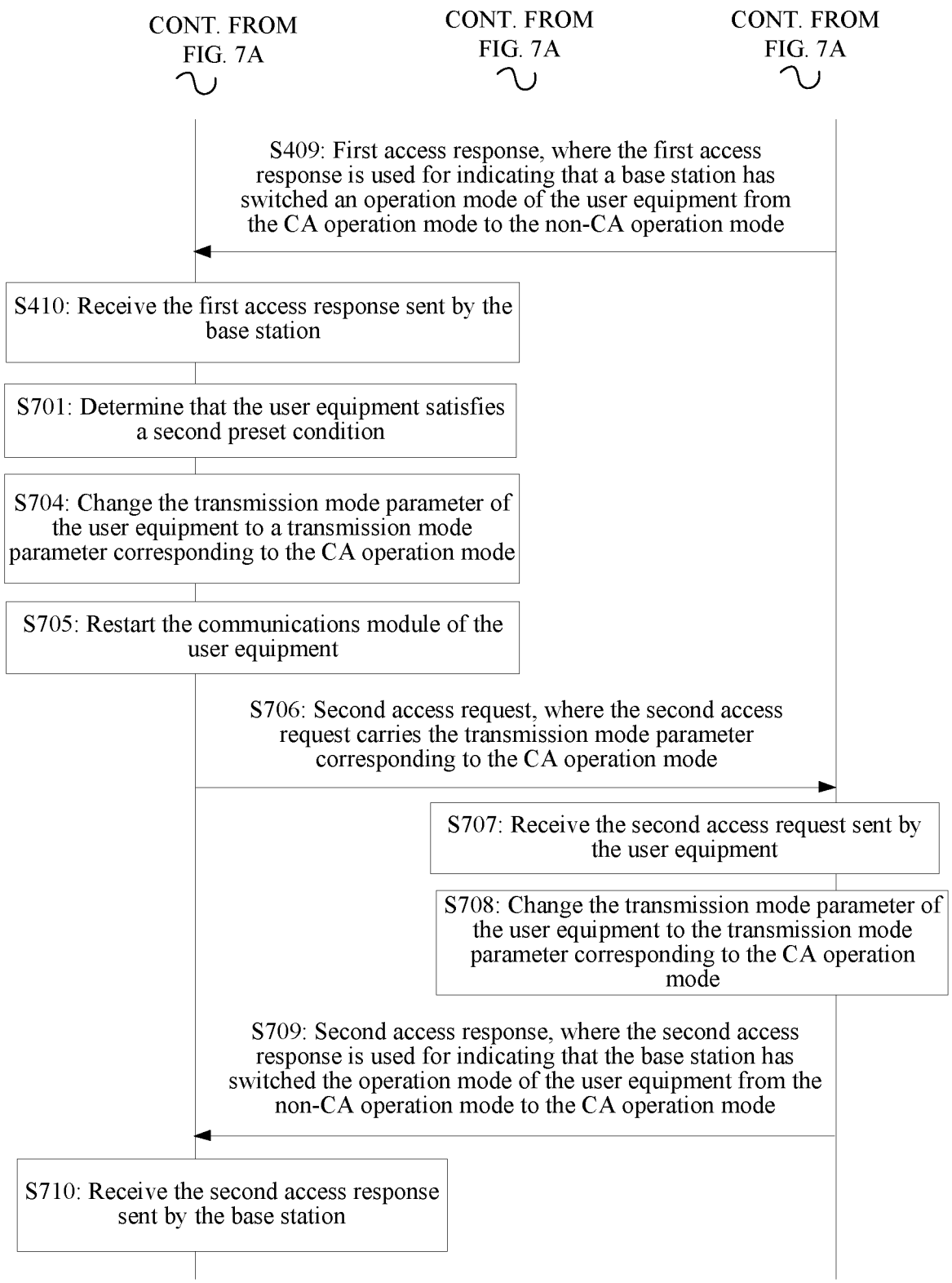

It should be noted that, after S410 shown in FIG. 4, the processor 201 has determined that the user equipment has the CA operation mode switching capability (refer to S402 in the foregoing embodiment), and currently the user equipment has switched to the non-CA operation mode (refer to S409 in the foregoing embodiment). Therefore, according to the operation mode switching method provided in this embodiment of the present invention, as shown in FIG. 7A and FIG. 7B, after S410 and S701, the processor 201 may not perform S702 and/or S703, but directly perform S704.

Optionally, in a first application scenario provided in this embodiment of the present invention, the transmission mode parameter may be a protocol stack version of the user equipment. By changing the protocol stack version of the user equipment, the processor 201 may change the transmission mode parameter of the user equipment to the transmission mode parameter corresponding to the CA operation mode. Specifically, S704 may be replaced with S704a:

S704a: The processor 201 changes the protocol stack version of the user equipment from the second version to the first version.

Optionally, in a second application scenario provided in this embodiment of the present invention, the transmission mode parameter may be the identifier that is of the CA combination supported by the user equipment and that is included in the configuration file of the user equipment. By changing the identifier that is of the CA combination supported by the user equipment and that is included in the configuration file, the processor 201 may implement, on the user equipment, the operation mode switching for the user equipment. Specifically, S704 may be replaced with S704b:

S704b: The processor 201 adds the identifier of the CA combination supported by the user equipment into the configuration file of the user equipment.

For a method of "changing, by the processor 201, the protocol stack version of the user equipment from the second version to the first version" in S704a, refer to a related description of S404a. For a method of "adding, by the processor 201, the identifier of the CA combination supported by the user equipment into the configuration file of the user equipment" in S704b, refer to a related description of S404b. Details are not described herein again in this embodiment of the present invention.

S705: The processor 201 restarts the communications module of the user equipment.

The communications module of the user equipment may be the MODEM of the user equipment. That the processor 201 restarts the MODEM of the user equipment may be specifically that the processor 201 restarts the protocol stack of the user equipment.

The user equipment may restart the protocol stack of the user equipment after changing the transmission mode parameter of the user equipment from the transmission mode parameter corresponding to the non-CA operation mode to the transmission mode parameter corresponding to the CA operation mode. In this case, the user equipment may work in the protocol stack of the first version, namely, a protocol stack corresponding to the CA operation mode.

S706: The processor 201 sends a second access request to the base station by using the communications interface 202, where the second access request carries the transmission mode parameter corresponding to the CA operation mode.

The second access request carries the transmission mode parameter corresponding to the CA operation mode. Therefore, the second access request may be used for requesting the base station to change, on a base station side, the transmission mode parameter of the user equipment to the transmission mode parameter corresponding to the CA operation mode. In this way, the operation mode of the user equipment may be switched from the non-CA operation mode to the CA operation mode.

In the first application scenario, the transmission mode parameter is the protocol stack version of the user equipment. The user equipment sends the second access request to the base station. The second access request carries the transmission mode parameter corresponding to the CA operation mode. In other words, the second access request carries the protocol stack (such as the release 10) of the first version.

In the second application scenario, the transmission mode parameter is the identifier that is of the CA combination supported by the user equipment and that is included in the configuration file of the user equipment. After the user equipment adds the identifier of the CA combination supported by the user equipment into the configuration file of the user equipment, the configuration file of the user equipment includes the identifier of the CA combination, and it indicates that currently the user equipment can work in the CA operation mode. The user equipment sends the second access request to the base station. The second access request carries the transmission mode parameter corresponding to the CA operation mode. In other words, the second access request carries the configuration file of the user equipment that includes the identifier (such as B1+B3) of the CA combination.

S707: The base station receives the second access request sent by the user equipment, where the second access request carries the transmission mode parameter corresponding to the CA operation mode.

S708: The base station changes the transmission mode parameter of the user equipment to the transmission mode parameter corresponding to the CA operation mode.

The second access request carries the transmission mode parameter corresponding to the CA operation mode. Therefore, after receiving the second access request, the base station may change, on the base station side, the transmission mode parameter of the user equipment to the transmission mode parameter corresponding to the CA operation mode. In this way, the operation mode of the user equipment may be switched from the non-CA operation mode to the CA operation mode.

S709: The base station sends a second access response to the communications interface 202 of the user equipment, where the second access response is used for indicating that the base station has switched the operation mode of the user equipment from the non-CA operation mode that the user equipment is currently in to the CA operation mode.

S710: The processor 201 receives, by using the communications interface 202, the second access response sent by the base station.

According to the operation mode switching method provided in this embodiment of the present invention, the user equipment may automatically detect the current data transmission rate and/or the battery temperature of the user equipment, and when the current data transmission rate of the user equipment is less than the second rate threshold and/or the battery temperature of the user equipment is less than the second temperature threshold, change, on the user equipment, the transmission mode parameter of the user equipment if the user equipment is in the non-CA operation mode, and send the second access request to the base station, to switch the operation mode of the user equipment from the non-CA operation mode to the CA operation mode.

Further, the CA operation mode in this embodiment of the present invention may include the 3CC operation mode and the 2CC operation mode. That "the processor 201 changes the operation mode of the user equipment from the CA operation mode to the non-CA operation mode" may include: The processor 201 switches the operation mode of the user equipment from the 3CC operation mode to the non-CA operation mode, or the processor 201 switches the operation mode of the user equipment from the 2CC operation mode to the non-CA operation mode.

In this case, the processor 201 not only can perform operation mode switching for the user equipment between the CA operation mode and the non-CA operation mode, but also can perform operation mode switching for the user equipment between the 3CC operation mode and the 2CC operation mode. Compared with the 3CC operation mode, the 2CC operation mode may provide a lower data transmission rate, and power consumption of the user equipment working in the 2CC operation mode is less than power consumption of the user equipment working in the 3CC operation mode. Therefore, to reduce the power consumption of the user equipment, the processor 201 may further switch the user equipment from the 3CC operation mode to the 2CC operation mode when the user equipment currently works in the 3CC operation mode. After the processor 201 switches the operation mode of the user equipment from the 3CC operation mode to the 2CC operation mode, the user equipment may work in the 2CC operation mode. The processor 201 switches the operation mode of the user equipment from the 2CC operation mode to the non-CA operation mode only under a particular condition.

Figure 8A:
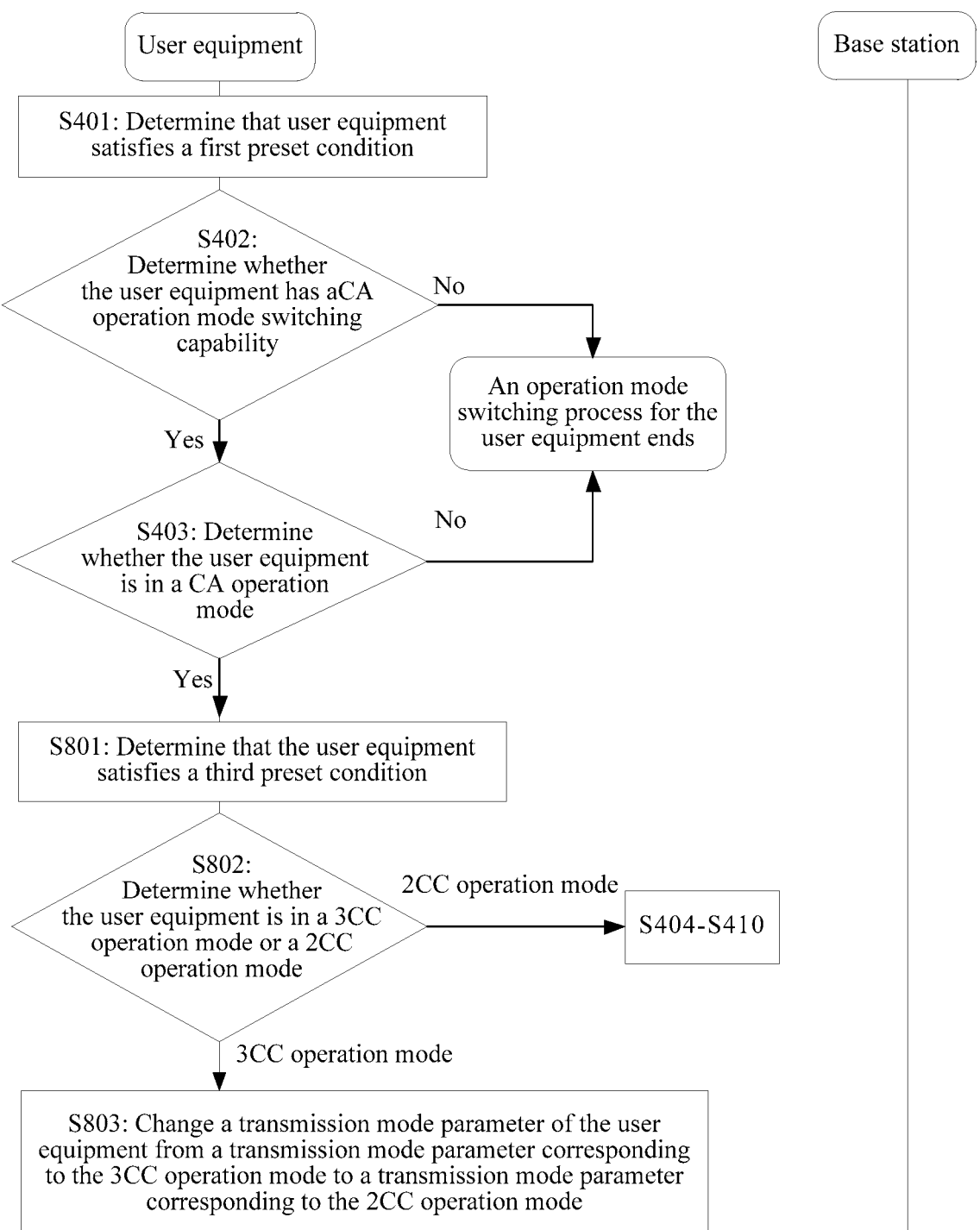
FIG. 8A and FIG. 8B are a flowchart of another operation mode switching method according to an embodiment of the present invention.
Figure 8B:
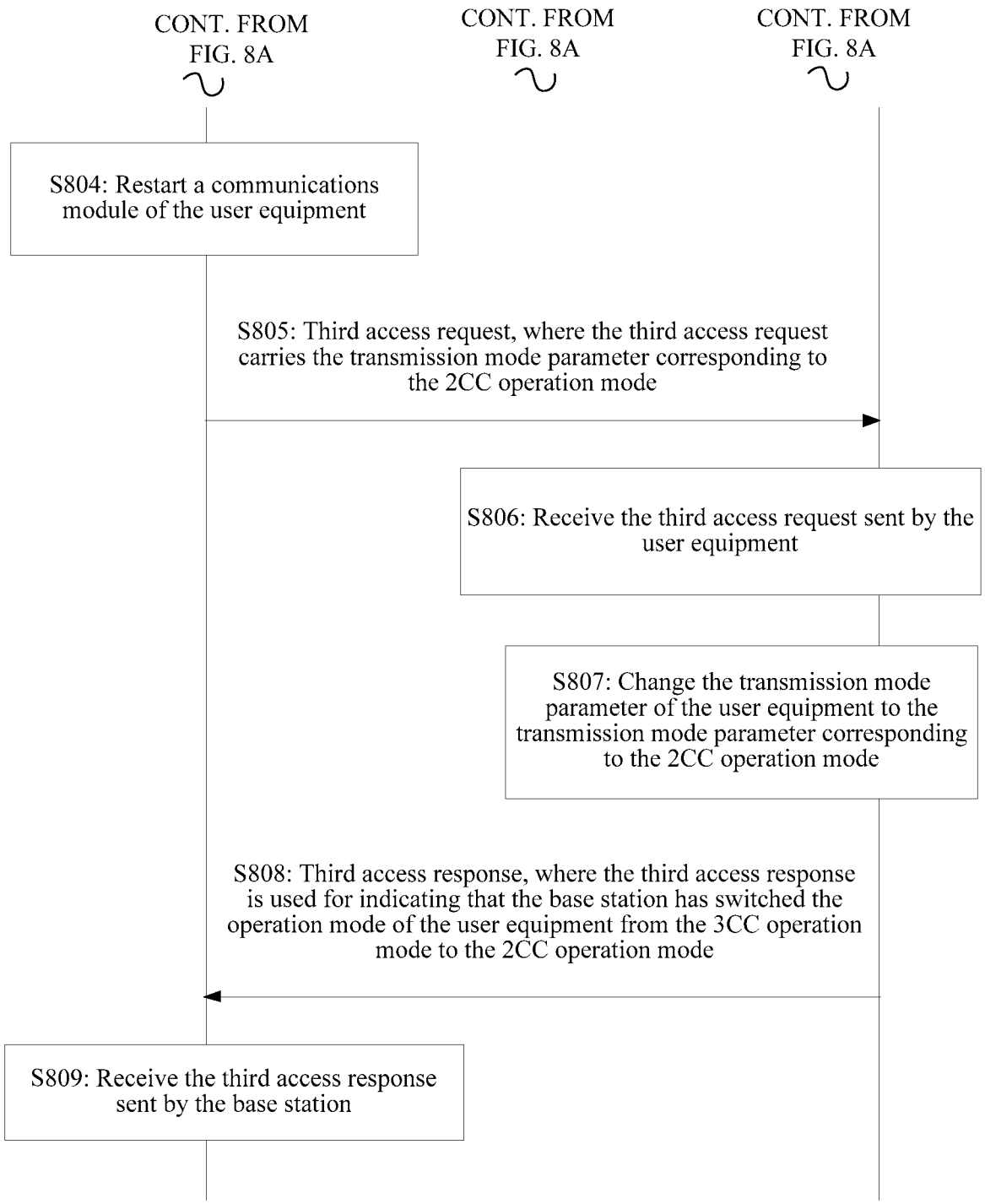

Herein in this embodiment of the present invention, that the processor 201 switches the operation mode of the user equipment from the 3CC operation mode to the 2CC operation mode is described by using a case in which "the processor 201 switches the operation mode of the user equipment from the 3CC operation mode to the 2CC operation mode, and then switches the operation mode of the user equipment from the 2CC operation mode to the non-CA operation mode". Specifically, after S403, a method according to an embodiment of the present invention may further include S801-S809. For example, as shown in FIG. 8A and FIG. 8B, after S403 in FIG. 4, the operation mode switching method provided in this embodiment of the present invention may further include S801-S809.

S801: The processor 201 determines that the user equipment satisfies a third preset condition.

The third preset condition includes: the current data transmission rate of the user equipment is less than a third rate threshold, and/or the battery temperature of the user equipment is greater than a third temperature threshold. The third rate threshold is greater than the first rate threshold, and the third temperature threshold is less than the first temperature threshold and greater than the second temperature threshold.

For example, when the current data transmission rate of the user equipment is less than the third rate threshold, the user equipment may determine that the user equipment satisfies the third preset condition; or when the battery temperature of the user equipment is greater than the third temperature threshold, the processor 201 may determine that the user equipment satisfies the third preset condition; or when the current data transmission rate of the user equipment is less than the third rate threshold, and the battery temperature of the user equipment is greater than the third temperature threshold, the processor 201 may determine that the user equipment satisfies the third preset condition.

S802: The processor 201 determines whether the user equipment is in a 3CC operation mode or a 2CC operation mode.

A method of determining, by the processor 201, whether the user equipment is in the 3CC operation mode or the 2CC operation mode is similar to the method of determining, by the processor 201, whether the user equipment is in the CA operation mode. Details are not described herein again in this embodiment of the present invention.

When the current data transmission rate of the user equipment is less than the third rate threshold, it indicates that the current service performed by the user equipment has a relatively low requirement on a data transmission rate, and does not require high-speed data transmission to be performed. In other words, it indicates that normal execution of the current service can be ensured when the user equipment currently works in the 2CC operation mode that may provide a relatively low data transmission rate; and to ensure the normal execution of the current service, it is not necessary for the user equipment to work in the 3CC operation mode that may provide a relatively high data transmission rate. In this way, if the user equipment is in the 3CC operation mode, when the current data transmission rate of the user equipment is less than the third rate threshold, the processor 201 may switch the user equipment from the 3CC operation mode that the user equipment is currently in to the 2CC operation mode.

Similarly, when the user equipment performs high-speed data transmission, the power consumption of the user equipment is relatively large, and this may cause the battery temperature of the user equipment to be relatively high. When the battery temperature of the user equipment is greater than a value, power-off is triggered, and even there may be a security threat. When the user equipment works in the 3CC operation mode that may provide the relatively high data transmission rate, the power consumption of the user equipment is relatively high, and when the user equipment works in the 2CC operation mode that may provide the relatively low data transmission rate, the power consumption of the user equipment is relatively low. Therefore, to reduce the power consumption of the user equipment, so as to reduce the battery temperature of the user equipment, when the battery temperature of the user equipment is greater than the third temperature threshold, the processor 201 changes the transmission mode parameter of the user equipment to the transmission mode parameter corresponding to the 2CC operation mode, and requests the base station to change the operation mode of the user equipment from the 3CC operation mode to the 2CC operation mode, so that the user equipment works in the 2CC operation mode.

Specifically, if currently the user equipment is in the 2CC operation mode, the method in this embodiment of the present invention returns to S404-S410. If currently the user equipment is in the 3CC operation mode, the method in this embodiment of the present invention proceeds to S803-S809.

S803: The processor 201 changes a transmission mode parameter of the user equipment from a transmission mode parameter corresponding to the 3CC operation mode to a transmission mode parameter corresponding to the 2CC operation mode.

Optionally, in a first application scenario provided in this embodiment of the present invention, the transmission mode parameter is a protocol stack version of the user equipment. The processor 201 changes the protocol stack version of the user equipment from a protocol stack version corresponding to the 3CC operation mode to a protocol stack version corresponding to the 2CC operation mode, in other words, changes the transmission mode parameter of the user equipment from the transmission mode parameter corresponding to the 3CC operation mode to the transmission mode parameter corresponding to the 2CC operation mode.

Optionally, in a second application scenario provided in this embodiment of the present invention, the processor 201 changes the identifier that is of the CA combination supported by the user equipment and that is included in the configuration file of the user equipment from a 3CC combination identifier to a 2CC combination identifier, in other words, changes the transmission mode parameter of the user equipment from the transmission mode parameter corresponding to the 3CC operation mode to the transmission mode parameter corresponding to the 2CC operation mode.

S804: The processor 201 restarts a communications module of the user equipment.

The communications module of the user equipment may be the MODEM of the user equipment. That the processor 201 restarts the MODEM of the user equipment may be specifically that the processor 201 restarts the protocol stack of the user equipment.

After the user equipment changes the transmission mode parameter of the user equipment from the transmission mode parameter corresponding to the 3CC operation mode to the transmission mode parameter corresponding to the 2CC operation mode, the protocol stack of the user equipment is changed from the protocol stack version corresponding to the 3CC operation mode to the protocol stack version corresponding to the 2CC operation mode. Subsequently, the user equipment may restart the protocol stack of the user equipment, indicating that the user equipment may work in a protocol stack corresponding to the 2CC operation mode.

S805: The processor 201 sends a third access request to a base station by using a communications interface 202, where the third access request carries the transmission mode parameter corresponding to the 2CC operation mode.

In the first application scenario, the processor 201 may restart the communications module of the user equipment, and send the third access request to the base station by using a protocol stack of a third version and the communications interface 202. The third access request carries the transmission mode parameter corresponding to the 2CC operation mode.

S806: The base station receives the third access request sent by the user equipment.

S807: The base station changes the transmission mode parameter of the user equipment to the transmission mode parameter corresponding to the 2CC operation mode.

The third access request carries the transmission mode parameter corresponding to the 2CC operation mode. Therefore, after receiving the third access request, the base station may change, on the base station side, the transmission mode parameter of the user equipment to the transmission mode parameter corresponding to the 2CC operation mode. In this way, the operation mode of the user equipment may be switched from the 3CC operation mode to the 2CC operation mode.

S808: The base station sends a third access response to the communications interface 202 of the user equipment, where the third access response is used for indicating that the base station has switched the operation mode of the user equipment from the 3CC operation mode to the 2CC operation mode.

S809: The processor 201 receives, by using the communications interface 202, the third access response sent by the base station.

It should be noted that, when the CA operation mode includes the 3CC operation mode and the 2CC operation mode in this embodiment of the present invention, after the processor 201 switches the operation mode of the user equipment from the 3CC operation mode to the 2CC operation mode, the power consumption of the user equipment can be reduced. If the power consumption of the user equipment is relatively low after the user equipment works in the 2CC operation mode for a period of time, the user equipment may switch the operation mode of the user equipment from the 2CC operation mode to the 3CC operation mode. A method of the "switching, by the processor 201, the operation mode of the user equipment from the non-CA operation mode to the 3CC operation mode" may specifically include: The processor 201 switches the operation mode of the user equipment from the non-CA operation mode to the 2CC operation mode, and then switches the operation mode of the user equipment from the 2CC operation mode to the 3CC operation mode.

Figure 9:
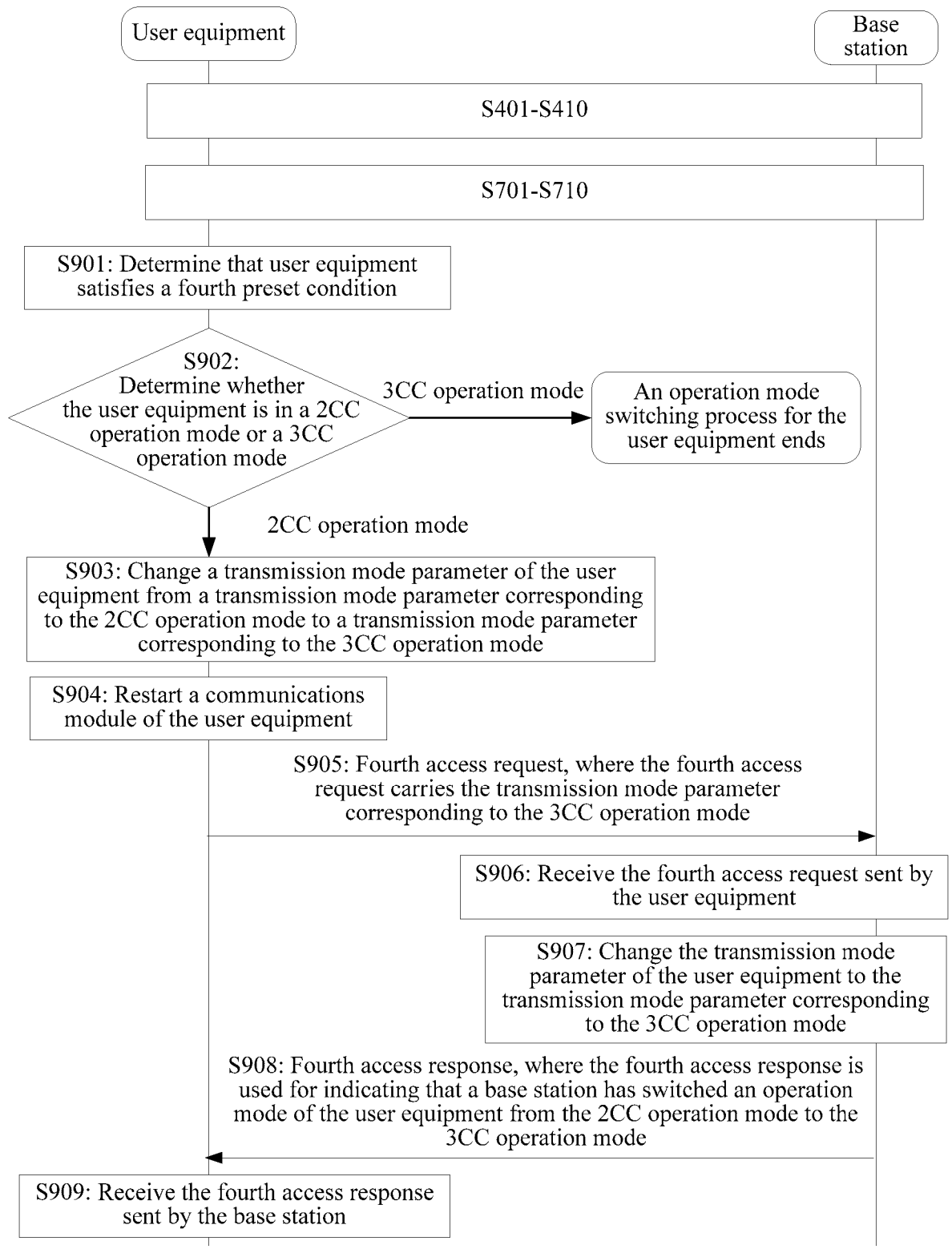
FIG. 9 is a flowchart of another operation mode switching method according to an embodiment of the present invention.

Specifically, after S710, a method according to an embodiment of the present invention may further include S901-S909. For example, as shown in FIG. 9, after S710 in FIG. 7A and FIG. 7B, the operation mode switching method provided in this embodiment of the present invention may further include S901-S909.

S901: The processor 201 determines that the user equipment satisfies a fourth preset condition.

The fourth preset condition includes: the current data transmission rate of the user equipment is less than a fourth rate threshold, and/or the battery temperature of the user equipment is less than a fourth temperature threshold. The fourth rate threshold is greater than the first rate threshold, and the fourth rate threshold is less than the third rate threshold. The fourth temperature threshold is less than the second temperature threshold, and the fourth temperature threshold is less than the third temperature threshold.

For example, when the current data transmission rate of the user equipment is less than the fourth rate threshold, the processor 201 may determine that the user equipment satisfies the fourth preset condition; or when the battery temperature of the user equipment is less than the fourth temperature threshold, the processor 201 may determine that the user equipment satisfies the fourth preset condition.

Further, to ensure the normal execution of the current service, and also to avoid the frequent operation mode switching for the user equipment due to a change of the current data transmission rate, when the current data transmission rate of the user equipment is less than the fourth rate threshold and the battery temperature of the user equipment is less than the fourth temperature threshold, the processor 201 may determine that the user equipment satisfies the fourth preset condition.

S902: The processor 201 determines whether the user equipment is in a 2CC operation mode or a 3CC operation mode.

A method of determining, by the processor 201, whether the user equipment is in the 3CC operation mode or the 2CC operation mode is similar to the method of determining, by the processor 201, whether the user equipment is in the CA operation mode. Details are not described herein again in this embodiment of the present invention.

Specifically, if currently the user equipment is in the 3CC operation mode, the operation mode switching process for the user equipment ends. If currently the user equipment is in the 2CC operation mode, the method in this embodiment of the present invention proceeds to S903-S908.

S903: The processor 201 changes the transmission mode parameter of the user equipment from a transmission mode parameter corresponding to the 2CC operation mode to a transmission mode parameter corresponding to the 3CC operation mode.

Optionally, a method of the "changing, by the processor 201, the transmission mode parameter of the user equipment from a transmission mode parameter corresponding to the 3CC operation mode to a transmission mode parameter corresponding to the 2CC operation mode" specifically includes: By using the protocol stack version of the user equipment or the configuration file of the user equipment, the processor 201 may change the transmission mode parameter of the user equipment from the transmission mode parameter corresponding to the 3CC operation mode to the transmission mode parameter corresponding to the 2CC operation mode.

S904: The processor 201 restarts the communications module of the user equipment.

The communications module of the user equipment may be the MODEM of the user equipment. That the processor 201 restarts the MODEM of the user equipment may be specifically that the processor 201 restarts the protocol stack of the user equipment.

S905: The processor 201 sends a fourth access request to the base station by using the communications interface 202, where the fourth access request carries the transmission mode parameter corresponding to the 3CC operation mode.

S906: The base station receives the fourth access request sent by the user equipment.

S907: The base station changes the transmission mode parameter of the user equipment to the transmission mode parameter corresponding to the 3CC operation mode.

S908: The base station sends a fourth access response to the user equipment, where the fourth access response is used for indicating that the base station has switched the operation mode of the user equipment from the 2CC operation mode to the 3CC operation mode.

S909: The user equipment receives, by using the communications interface 202, the fourth access response sent by the base station.

For a detailed description of S901-S909 in this embodiment of the present invention, refer to the related description of S401-S410 in the foregoing embodiment. Details are not described herein again in this embodiment of the present invention.

Optionally, that "the user equipment satisfies the first preset condition" in this embodiment of the present invention may be specifically: A current service requirement of the user equipment is less than the first rate threshold. Before the processor 201 determines that the user equipment satisfies the first preset condition, the processor 201 may monitor the battery temperature of the user equipment in real time or periodically, and control the data transmission rate of the user equipment when the battery temperature of the user equipment is greater than a fifth temperature threshold, so that the data transmission rate of the user equipment is less than the first rate threshold. A higher data transmission rate of the user equipment indicates higher power consumption of the user equipment, consequently causing the battery temperature of the user equipment to increase. Therefore, when the battery temperature of the user equipment is greater than the fifth temperature threshold, the processor 201 may control the data transmission rate of the user equipment, so that the data transmission rate of the user equipment is reduced and is less than the first rate threshold. In this way, an effect of reducing the battery temperature of the user equipment can be achieved. The fifth temperature threshold may be equal to the first temperature threshold, or may be greater than the first temperature threshold.

According to the operation mode switching method provided in this embodiment of the present invention, the processor 201 may perform operation mode switching for the user equipment between the CA operation mode and the non-CA operation mode, or may perform operation mode switching for the user equipment between the 3CC operation mode and the 2CC operation mode. By using this solution, the user equipment may perform operation mode switching for the user equipment between the 3CC operation mode, the 2CC operation mode, and the non-CA operation mode, that is, may implement stagewise switching between operation modes of the user equipment.

The foregoing mainly describes the solutions provided in the embodiments of the present invention from the perspective of interaction between network elements. It should be understood that, to implement the foregoing functions, the network elements, such as the user equipment and the base station, include corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, modules of the user equipment and the base station may be divided based on the foregoing method examples. For example, each module may be divided based on each function, or two or more functions may be integrated into one processing module. The integrated module may be implemented in a form of hardware, or may be implemented in a form of a software functional module. It should be noted that the module division in the embodiments of the present invention is an example, and is merely logical function division. There may be other division manners in an actual implementation.

Figure 10:
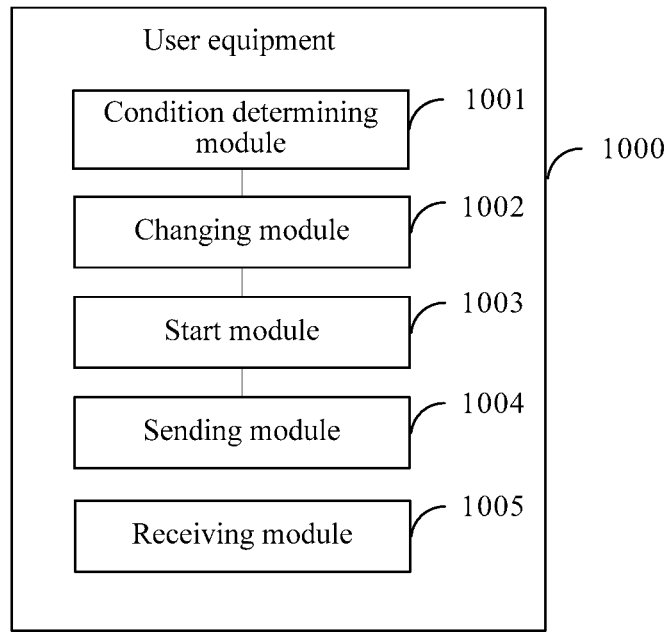
FIG. 10 is another possible schematic structural diagram of user equipment according to an embodiment of the present invention.

FIG. 10 shows a possible structure of the user equipment according to the foregoing embodiments. As shown in FIG. 10, the user equipment 1000 includes: a condition determining module 1001, a changing module 1002, a start module 1003, a sending module 1004, and a receiving module 1005.

The condition determining module 1001 is configured to support the user equipment in performing S401, S701, S801, and S901 in the foregoing embodiments, and/or another process used for the technology described in this specification. The changing module 1002 is configured to support the user equipment in performing S404, S404a, S404b, S704, S704a, S704b, S803, and S903 in the foregoing embodiments, and/or another process used for the technology described in this specification. The start module is configured to support the user equipment in performing S405, S705, S804, and S904 in the foregoing embodiments, and/or another process used for the technology described in this specification. The sending module 1004 is configured to support the user equipment in performing S406, S706, S805, and S905 in the foregoing embodiments, and/or another process used for the technology described in this specification. The receiving module 1005 is configured to support the user equipment in performing S410, S710, S809, and S909 in the foregoing embodiments, and/or another process used for the technology described in this specification.

Figure 11:
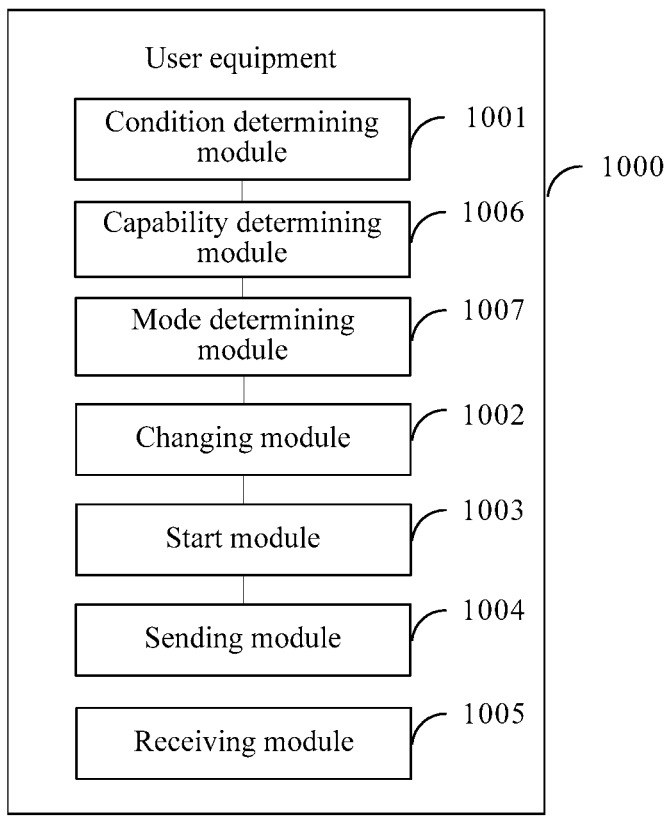
FIG. 11 is another possible schematic structural diagram of user equipment according to an embodiment of the present invention.

Further, as shown in FIG. 11, the user equipment 1000 may further include: a capability determining module 1006. The capability determining module 1006 is configured to support the user equipment in performing S402 and S702 in the foregoing embodiments, and/or another process used for the technology described in this specification.

Further, as shown in FIG. 11, the user equipment 1000 may further include: a mode determining module 1007. The mode determining module 1007 is configured to support the user equipment in performing S403, S703, S802, and S902 in the foregoing embodiments, and/or another process used for the technology described in this specification.

Certainly, the user equipment 1000 may further include: a storage module. The storage module may be configured to store a configuration file of the user equipment.

When an integrated module is used, the sending module 1004 and the receiving module 1005 may be implemented by being integrated into one communications module, and the communications module may be a communications interface, a transceiver circuit, a transceiver, or the like. The condition determining module 1001, the mode determining module 1007, the changing module 1002, the start module 1003, and the capability determining module 1006 may be implemented by being integrated into one processing module (such as a processor). The storage module may be a memory.

An embodiment of the present invention further provides a computer storage medium. The computer storage medium stores computer program code. The computer program code includes an instruction. When the processor 201 of the user equipment 200 executes the instruction, the user equipment 200 performs related method steps in the foregoing embodiments, to interact with a base station to implement operation mode switching for the user equipment.

For the modules in the user equipment provided in this embodiment of the present invention or detailed descriptions of the modules, and technical effects of performing related method steps in the foregoing embodiments by the functional units or modules, refer to related descriptions in the method embodiments of the present invention. Details are not described herein again.

Figure 12:
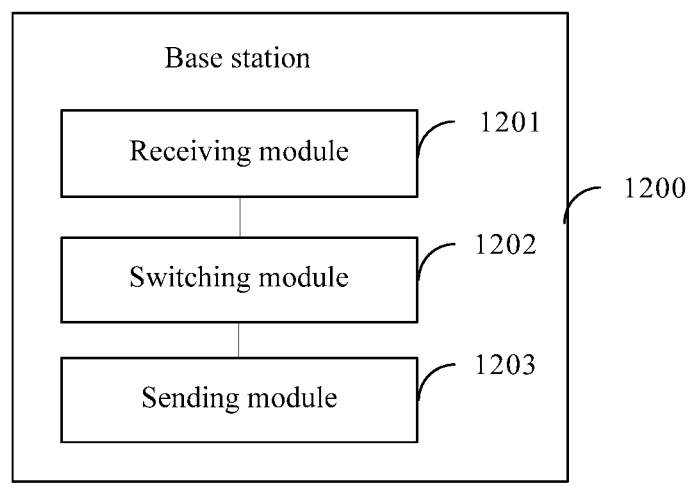
FIG. 12 is a possible schematic structural diagram of a base station according to an embodiment of the present invention.

FIG. 12 shows a possible structure of the base station according to the foregoing embodiments. As shown in FIG. 12, the base station 1200 includes: a receiving module 1201, a switching module 1202, and a sending module 1203.

The receiving module 1201 is configured to support the base station in performing S407, S707, S806, and S906 in the foregoing embodiments, and/or another process used for the technology described in this specification. The switching module 1202 is configured to support the base station in performing S408, S708, S807, and S907 in the foregoing embodiments, and/or another process used for the technology described in this specification. The sending module 1203 is configured to support the base station in performing S409, S709, S808, and S908 in the foregoing embodiments, and/or another process used for the technology described in this specification.

When an integrated module is used, the receiving module 1201 and the sending module 1203 may be implemented by being integrated into one communications module, and the communications module may be a communications interface, a transceiver circuit, a transceiver, or the like. The switching module 1202 may be implemented by being integrated into one processing module (such as a processor). The storage module may be a memory.

Figure 13:
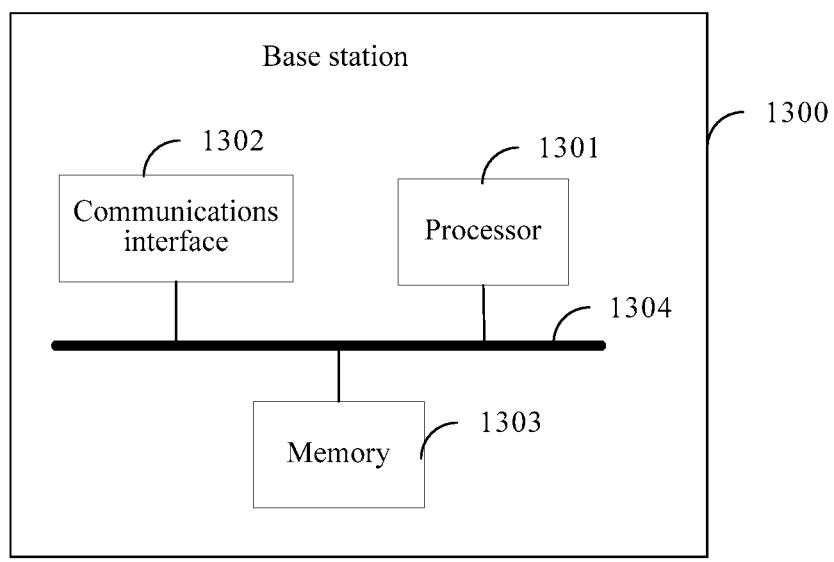
FIG. 13 is another possible schematic structural diagram of a base station according to an embodiment of the present invention.

When the processing module is the processor, the communications module is a communications interface, and the storage module is a memory, the base station provided in the embodiments of the present invention may be the base station 1300 shown in FIG. 13.

Referring to FIG. 13, the base station 1300 includes: a processor 1301, a communications interface 1302, a memory 1303, and a bus 1304. The processor 1301, the communications interface 1302, and the memory 1303 are connected to each other by using the bus 1304. The bus 1304 may be classified into an address bus, a data bus, a control bus, and the like. For ease of representation, only one thick line is used to represent the bus in FIG. 13, but this does not mean that there is only one bus or only one type of bus.

An embodiment of the present invention further provides a computer storage medium. The computer storage medium stores computer program code. The computer program code includes an instruction. When the processor 1301 of the base station 1300 executes the instruction, the base station 1300 performs related method steps in the foregoing embodiments, to interact with user equipment to perform operation mode switching for the user equipment.

It should be noted that, for detailed descriptions of the functional units and modules in the base station provided in this embodiment of the present invention, and technical effects of performing related method steps in the foregoing embodiments by the functional units or modules, refer to related descriptions in the method embodiments of the present invention. Details are not described herein again.

Method or algorithm steps described in combination with the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. An operation mode switching method, comprising:
   determining, by user equipment, that the user equipment satisfies a first preset condition, wherein the first preset condition comprises one or more of: a current data transmission rate of the user equipment being less than a first rate threshold, or a battery temperature of the user equipment being greater than a first temperature threshold;
   changing, by the user equipment, a transmission mode parameter of the user equipment to a transmission mode parameter corresponding to a non-carrier aggregation (CA) operation mode when the user equipment is in a CA operation mode, wherein the transmission mode parameter of the user equipment represents a data transmission rate of the user equipment, the CA operation mode and the non-CA operation mode are corresponding to different transmission mode parameters, a data transmission rate represented by a transmission mode parameter corresponding to the CA operation mode is greater than a data transmission rate represented by the transmission mode parameter corresponding to the non-CA operation mode;
   sending, by the user equipment, a first access request to a base station, wherein the first access request carries the transmission mode parameter corresponding to the non-CA operation mode;
   determining, by the user equipment, that the user equipment satisfies a second preset condition, wherein the second preset condition comprises one or more of: the current data transmission rate of the user equipment being less than a second rate threshold, or the battery temperature of the user equipment being less than a second temperature threshold, wherein the first rate threshold is greater than the second rate threshold, and the first temperature threshold is greater than the second temperature threshold;
   changing, by the user equipment, the transmission mode parameter of the user equipment to the transmission mode parameter corresponding to the CA operation mode; and sending, by the user equipment, a second access request to the base station, wherein the second access request carries the transmission mode parameter corresponding to the CA operation mode.

2. The method according to claim 1, wherein the transmission mode parameter is a protocol stack version of the user equipment; and the changing, by the user equipment, a transmission mode parameter of the user equipment to a transmission mode parameter corresponding to a non-CA operation mode comprises:

changing, by the user equipment, the protocol stack version of the user equipment from a first version to a second version, wherein a protocol stack of the first version is corresponding to the CA operation mode, and a protocol stack of the second version is corresponding to the non-CA operation mode.

3. The method according to claim 2, wherein the transmission mode parameter is a protocol stack version of the user equipment; and the changing, by the user equipment, the transmission mode parameter of the user equipment to the transmission mode parameter corresponding to the CA operation mode comprises:

changing, by the user equipment, the protocol stack version of the user equipment from a second version to a first version, wherein a protocol stack of the first version is corresponding to the CA operation mode, and the protocol stack of the second version is corresponding to the non-CA operation mode.

4. The method according to claim 2, wherein the transmission mode parameter is an identifier that is of a CA combination supported by the user equipment and that is comprised in a configuration file of the user equipment; and the changing, by the user equipment, the transmission mode parameter of the user equipment to the transmission mode parameter corresponding to the CA operation mode comprises:

adding, by the user equipment, the identifier of the CA combination supported by the user equipment into the configuration file of the user equipment.

5. The method according to claim 1, wherein the transmission mode parameter is an identifier that is of a CA combination supported by the user equipment and that is comprised in a configuration file of the user equipment; and the changing, by the user equipment, a transmission mode parameter of the user equipment to a transmission mode parameter corresponding to a non-CA operation mode comprises:

deleting, by the user equipment, the identifier that is of the CA combination supported by the user equipment and that is comprised in the configuration file of the user equipment.

6. User equipment, comprising: a processor, a memory, a bus, and a communications interface, wherein the processor, the memory, and the communications interface are connected to each other by using the bus; and the memory is configured to store computer program code, wherein the computer program code comprises an instruction, and when the processor executes the instruction, the user equipment performs operations comprising:

determining, by user equipment, that the user equipment satisfies a first preset condition, wherein the first preset condition comprises one or more of: a current data transmission rate of the user equipment being less than a first rate threshold, or a battery temperature of the user equipment being greater than a first temperature threshold;

changing, by the user equipment, a transmission mode parameter of the user equipment to a transmission mode parameter corresponding to a non-carrier aggregation (CA) operation mode when the user equipment is in a CA operation mode, wherein the transmission mode parameter of the user equipment is used for representing a data transmission rate of the user equipment, the CA operation mode and the non-CA operation mode are corresponding to different transmission mode parameters, a data transmission rate represented by a transmission mode parameter corresponding to the CA operation mode is greater than a data transmission rate represented by the transmission mode parameter corresponding to the non-CA operation mode;

sending, by the user equipment, a first access request to a base station, wherein the first access request carries the transmission mode parameter corresponding to the non-CA operation mode;

determining that the user equipment satisfies a second preset condition, wherein the second preset condition comprises one or more of: the current data transmission rate of the user equipment being less than a second rate threshold, or the battery temperature of the user equipment being less than a second temperature threshold, wherein the first rate threshold is greater than the second rate threshold, and the first temperature threshold is greater than the second temperature threshold;

changing the transmission mode parameter of the user equipment to the transmission mode parameter corresponding to the CA operation mode; and sending a second access request to the base station, wherein the second access request carries the transmission mode parameter corresponding to the CA operation mode.

7. The user equipment according to claim 6, wherein a transmission mode parameter is a protocol stack version of the user equipment; and the operations comprise:

changing the protocol stack version of the user equipment from a first version to a second version, wherein a protocol stack of the first version is corresponding to the CA operation mode, and a protocol stack of the second version is corresponding to the non-CA operation mode.

8. A non-transitory computer readable storage medium, storing one or more programs, that when executed by one or more hardware processors, cause the one or more hardware processors to perform operations comprising:

determining, by user equipment, that the user equipment satisfies a first preset condition, wherein the first preset condition comprises one or more of: a current data transmission rate of the user equipment being less than a first rate threshold, or a battery temperature of the user equipment being greater than a first temperature threshold;

changing, by the user equipment, a transmission mode parameter of the user equipment to a transmission mode parameter corresponding to a non- non-carrier aggregation (CA) operation mode when the user equipment is in a CA operation mode, wherein the transmission mode parameter of the user equipment is used for representing a data transmission rate of the user equipment, the CA operation mode and the non-CA operation mode are corresponding to different transmission mode parameters, a data transmission rate represented by a transmission mode parameter corresponding to the CA operation mode is greater than a data transmission rate represented by the transmission mode parameter corresponding to the non-CA operation mode; and sending, by the user equipment, a first access request to a base station, wherein the first access request carries the transmission mode parameter corresponding to the non-CA operation mode;

determining, by the user equipment, that the user equipment satisfies a second preset condition, wherein the second preset condition comprises one or more of: the current data transmission rate of the user equipment being less than a second rate threshold, or the battery temperature of the user equipment being less than a second temperature threshold, wherein the first rate threshold is greater than the second rate threshold, and the first temperature threshold is greater than the second temperature threshold;

changing, by the user equipment, the transmission mode parameter of the user equipment to the transmission mode parameter corresponding to the CA operation mode; and sending, by the user equipment, a second access request to the base station, wherein the second access request carries the transmission mode parameter corresponding to the CA operation mode.

9. The storage medium according to claim 8, wherein the transmission mode parameter is a protocol stack version of the user equipment; and the changing, by the user equipment, a transmission mode parameter of the user equipment to a transmission mode parameter corresponding to a non-CA operation mode comprises:

changing, by the user equipment, the protocol stack version of the user equipment from a first version to a second version, wherein a protocol stack of the first version is corresponding to the CA operation mode, and a protocol stack of the second version is corresponding to the non-CA operation mode.

10. The storage medium according to claim 8, wherein the transmission mode parameter is an identifier that is of a CA combination supported by the user equipment and that is comprised in a configuration file of the user equipment; and the changing, by the user equipment, a transmission mode parameter of the user equipment to a transmission mode parameter corresponding to a non-CA operation mode comprises:

deleting, by the user equipment, the identifier that is of the CA combination supported by the user equipment and that is comprised in the configuration file of the user equipment.

11. The storage medium according to claim 8, wherein the transmission mode parameter is a protocol stack version of the user equipment; and the changing, by the user equipment, the transmission mode parameter of the user equipment to the transmission mode parameter corresponding to the CA operation mode comprises:

changing, by the user equipment, the protocol stack version of the user equipment from a second version to a first version, wherein a protocol stack of the first version is corresponding to the CA operation mode, and the protocol stack of the second version is corresponding to the non-CA operation mode.

\* \* \* \* \*